United States Patent
Shimada et al.

(10) Patent No.: US 10,554,234 B2
(45) Date of Patent: Feb. 4, 2020

(54) TRANSMISSION DEVICE, TRANSMISSION METHOD, AND COMMUNICATION SYSTEM

(71) Applicant: Sony Corporation, Tokyo (JP)

(72) Inventors: Takahiro Shimada, Tokyo (JP); Hiroaki Hayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/077,888

(22) PCT Filed: Jan. 30, 2017

(86) PCT No.: PCT/JP2017/003174
§ 371 (c)(1),
(2) Date: Aug. 14, 2018

(87) PCT Pub. No.: WO2017/159074
PCT Pub. Date: Sep. 21, 2017

(65) Prior Publication Data
US 2019/0081648 A1    Mar. 14, 2019

(30) Foreign Application Priority Data
Mar. 14, 2016  (JP) ................. 2016-049184

(51) Int. Cl.
| | |
|---|---|
| *H04B 3/50* | (2006.01) |
| *H04W 52/12* | (2009.01) |
| *H04L 5/16* | (2006.01) |
| *H04B 1/04* | (2006.01) |
| *H04L 13/16* | (2006.01) |

(52) U.S. Cl.
CPC .............. *H04B 1/04* (2013.01); *H04L 13/16* (2013.01)

(58) Field of Classification Search
CPC .. H04L 5/14; H04L 5/16; H04L 12/40; H04B 3/50; H04B 1/38; H04W 52/02; H04W 52/0225; H04W 52/0209; H03F 1/56; H03F 3/68
See application file for complete search history.

(56) References Cited

U.S. PATENT DOCUMENTS 8,064,535 B2    11/2011  Wiley
8,638,838 B1 *  1/2014  Betts ................. H04L 5/16
                                                      326/30
(Continued)

FOREIGN PATENT DOCUMENTS

JP      06-261092 A    9/1994
JP      2004-056546 A  2/2004
(Continued)

*Primary Examiner* — Blane J Jackson
(74) *Attorney, Agent, or Firm* — Michael Best & Friedrich LLP

(57) ABSTRACT

A transmission device according to the disclosure includes a power supply section, a first transmitter, and a controller. The power supply section includes a voltage generator that generates a power supply voltage, and a load section configured to be able to change a load current at the voltage generator. The first transmitter has a first operation mode and a second operation mode, and transmits a first signal on the basis of the power supply voltage. The controller controls an operation of the load section when an operation mode of the first transmitter transitions between the first operation mode and the second operation mode.

20 Claims, 20 Drawing Sheets

(56) References Cited

U.S. PATENT DOCUMENTS

| | | | |
|---|---|---|---|
| 9,000,618 B2* | 4/2015 | Liao | H04L 25/0282 |
| | | | 307/108 |
| 9,515,610 B2* | 12/2016 | Chang | H03F 1/0205 |
| 2005/0195904 A1* | 9/2005 | Huang | H03F 3/45183 |
| | | | 375/257 |
| 2006/0018388 A1* | 1/2006 | Chan | H04B 3/23 |
| | | | 375/257 |
| 2006/0171477 A1* | 8/2006 | Carballo | H04L 25/0272 |
| | | | 375/257 |
| 2006/0172715 A1* | 8/2006 | Carballo | H04L 25/028 |
| | | | 455/127.2 |
| 2008/0037693 A1* | 2/2008 | Andrus | H04L 1/0057 |
| | | | 375/359 |
| 2008/0187056 A1* | 8/2008 | Gotoh | H04B 3/03 |
| | | | 375/257 |
| 2011/0164624 A1* | 7/2011 | Kelleher | H04B 1/40 |
| | | | 370/475 |
| 2014/0270005 A1* | 9/2014 | Sengoku | H04L 27/2071 |
| | | | 375/330 |
| 2015/0098537 A1* | 4/2015 | Sengoku | H04L 7/0087 |
| | | | 375/355 |
| 2017/0118039 A1* | 4/2017 | Wiley | G06F 13/42 |

FOREIGN PATENT DOCUMENTS

| | | |
|---|---|---|
| WO | 2015/050736 A1 | 4/2015 |
| WO | 2015/108847 A1 | 7/2015 |

\* cited by examiner

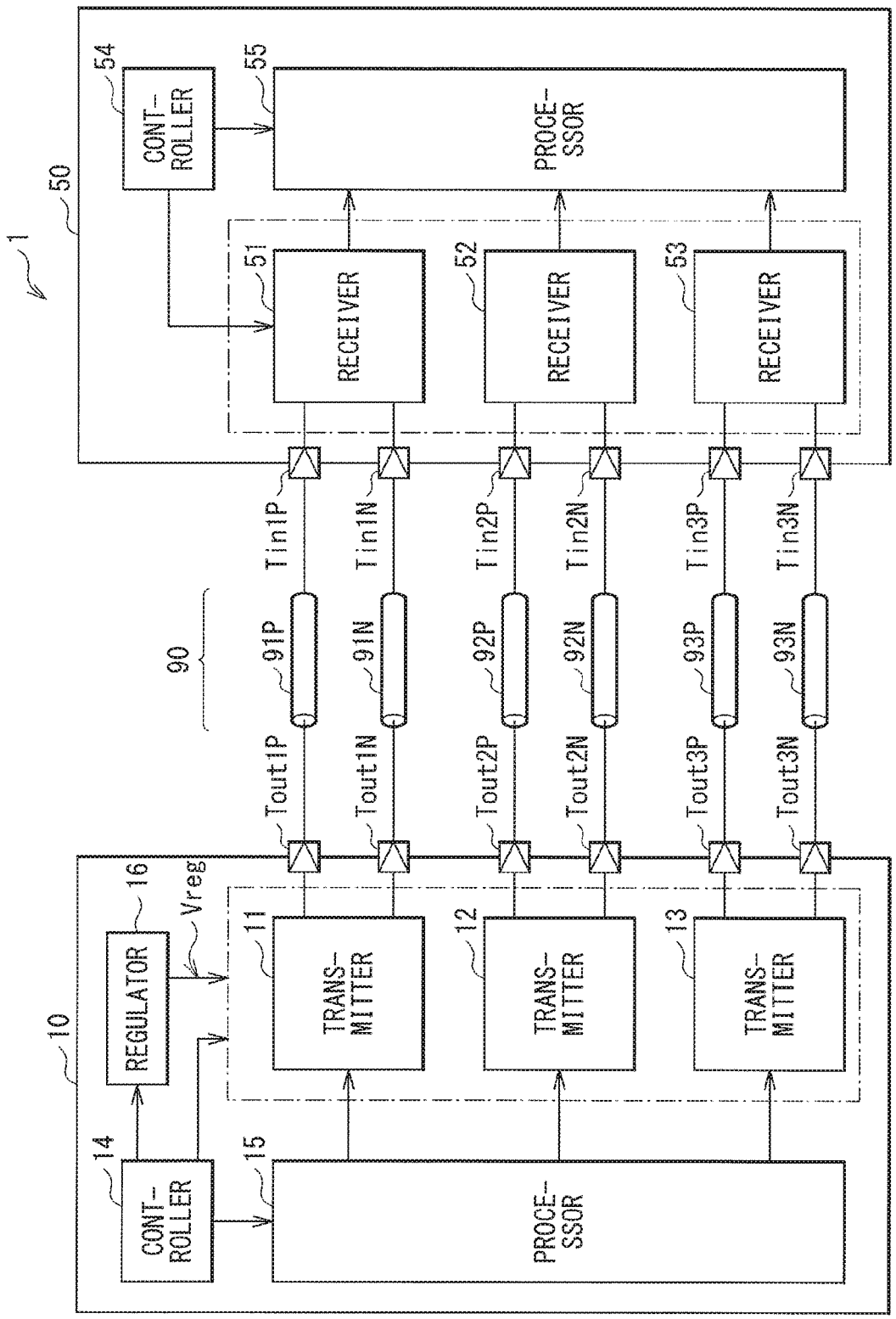
[FIG. 1]

[ FIG. 2 ]
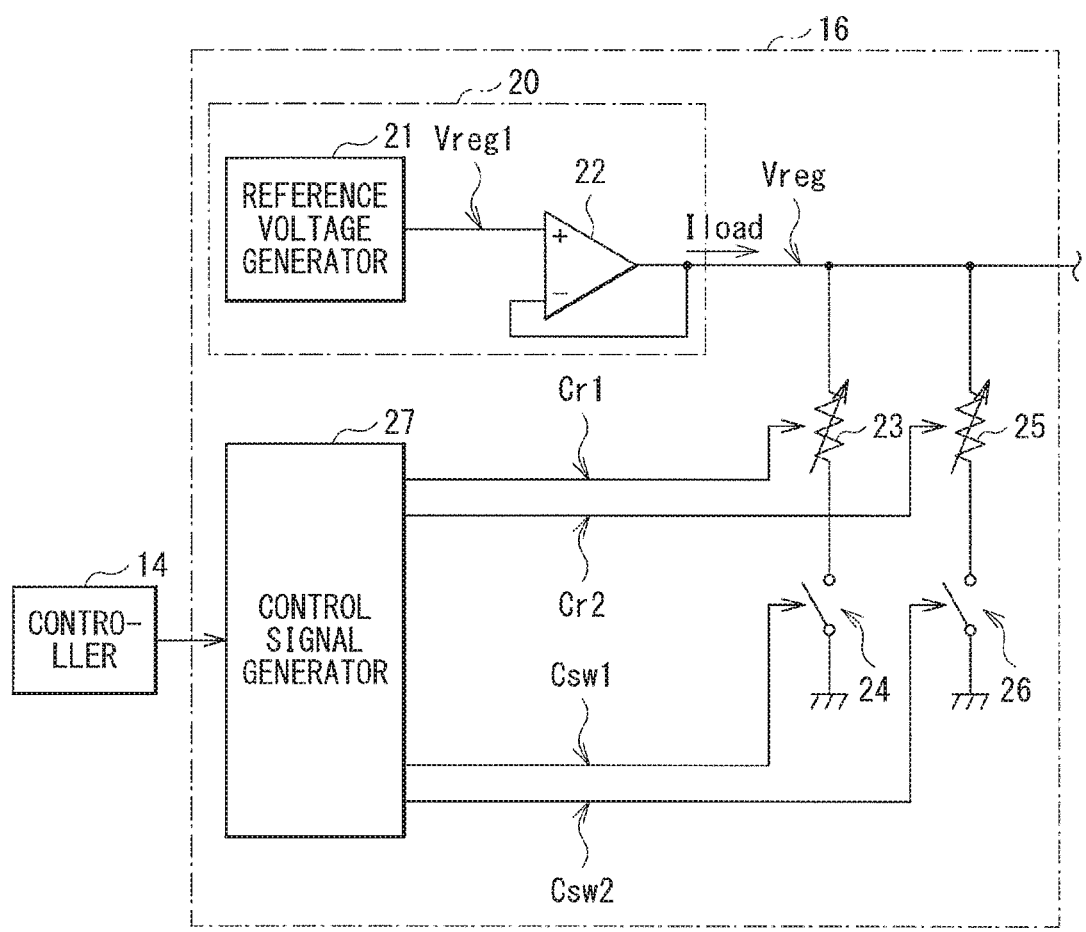

[ FIG. 3 ]
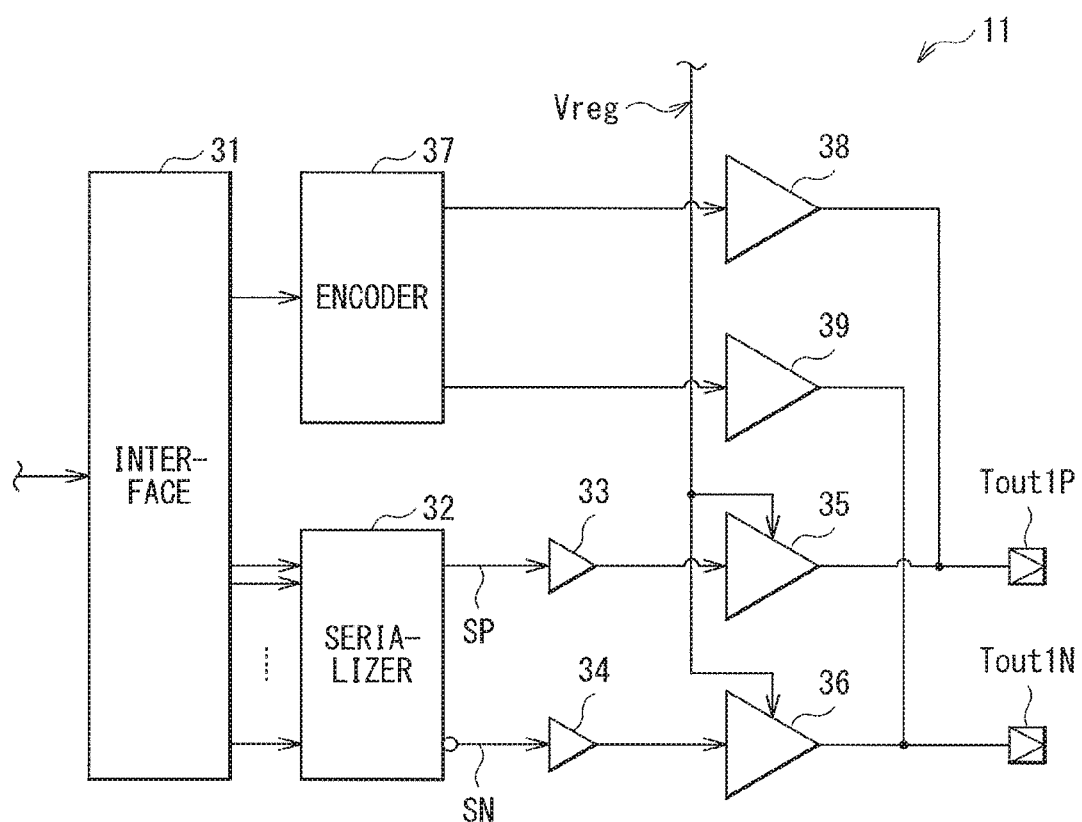

[ FIG. 4 ]
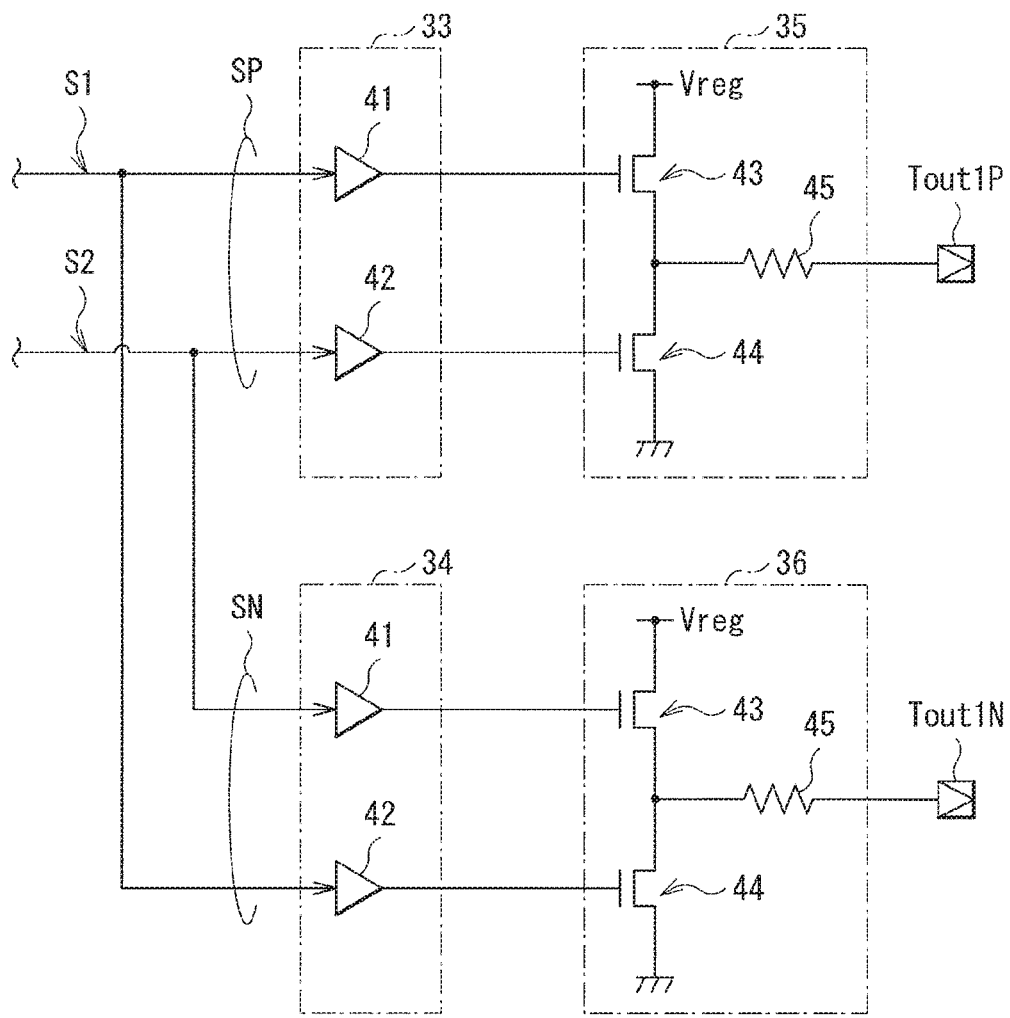

[FIG. 5]
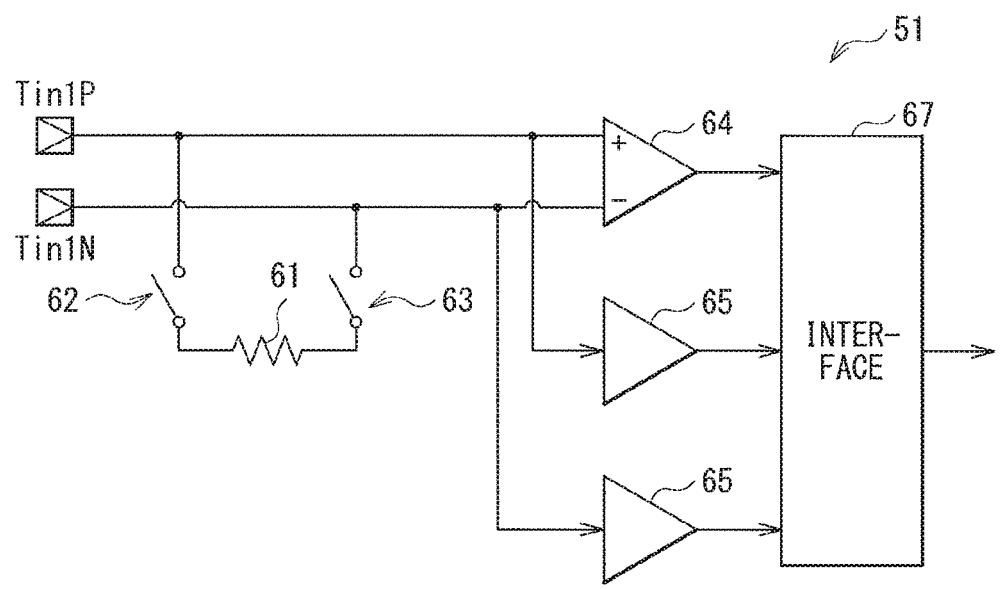

[FIG. 6]
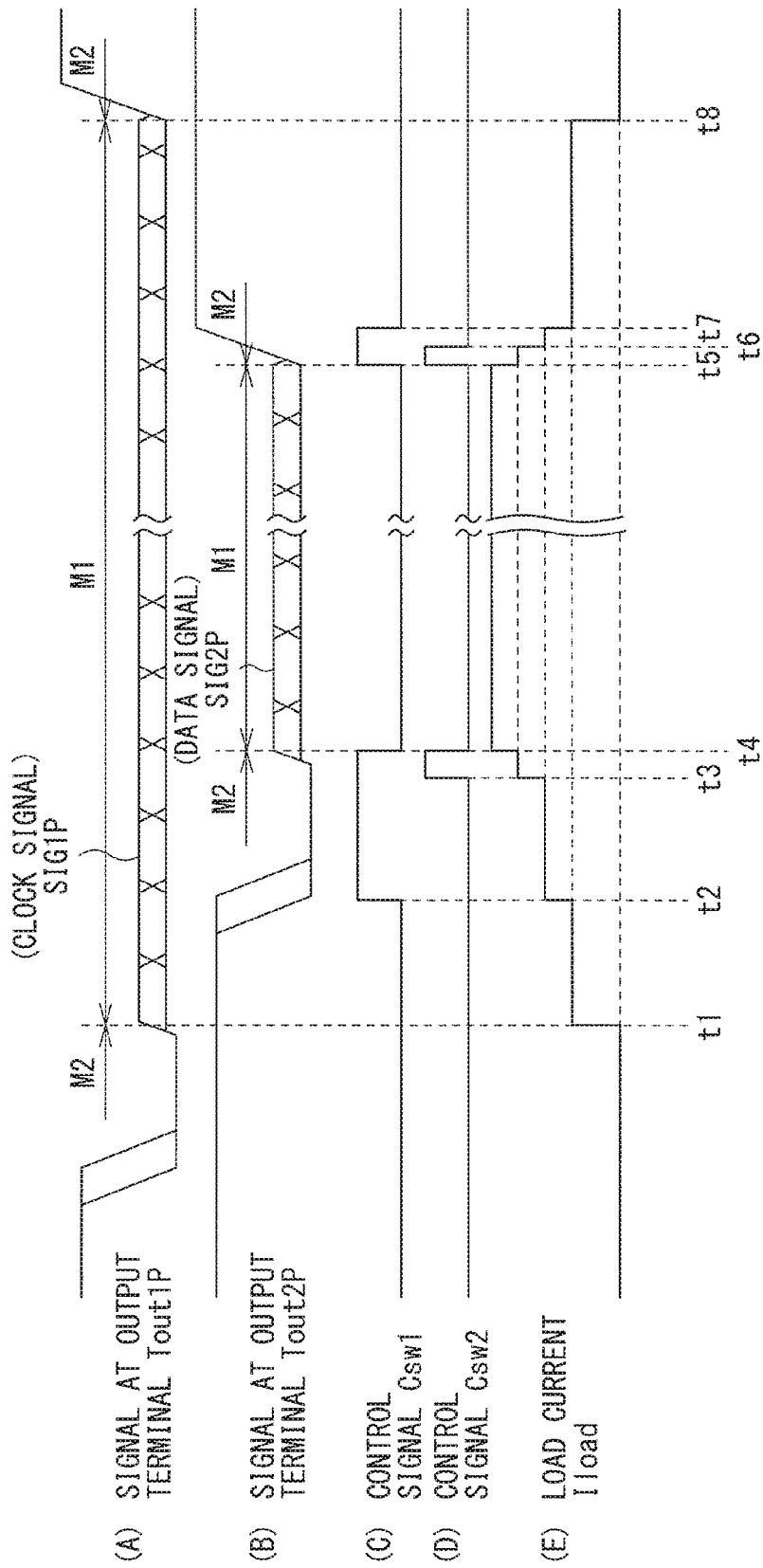

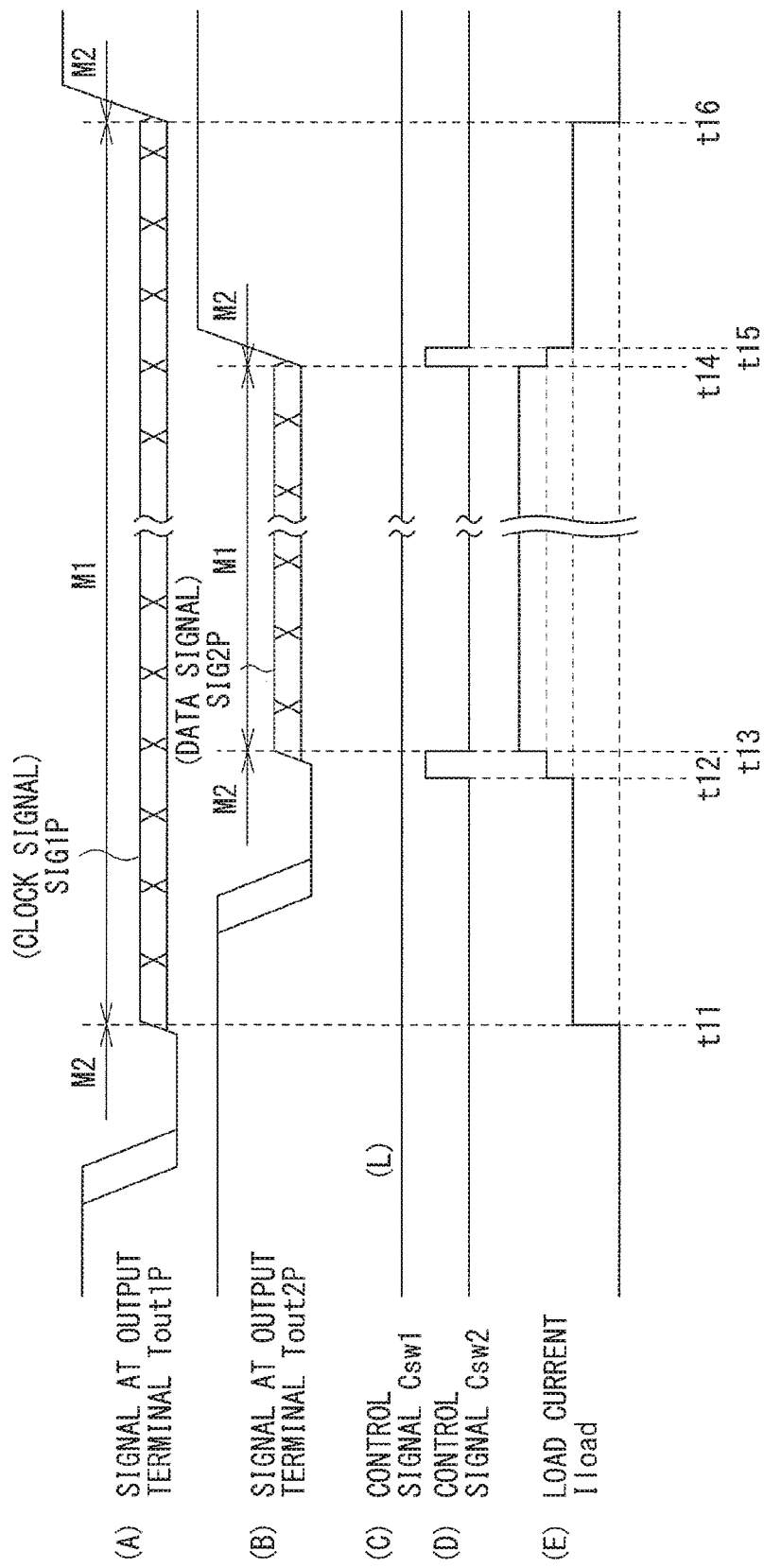
[FIG. 7]

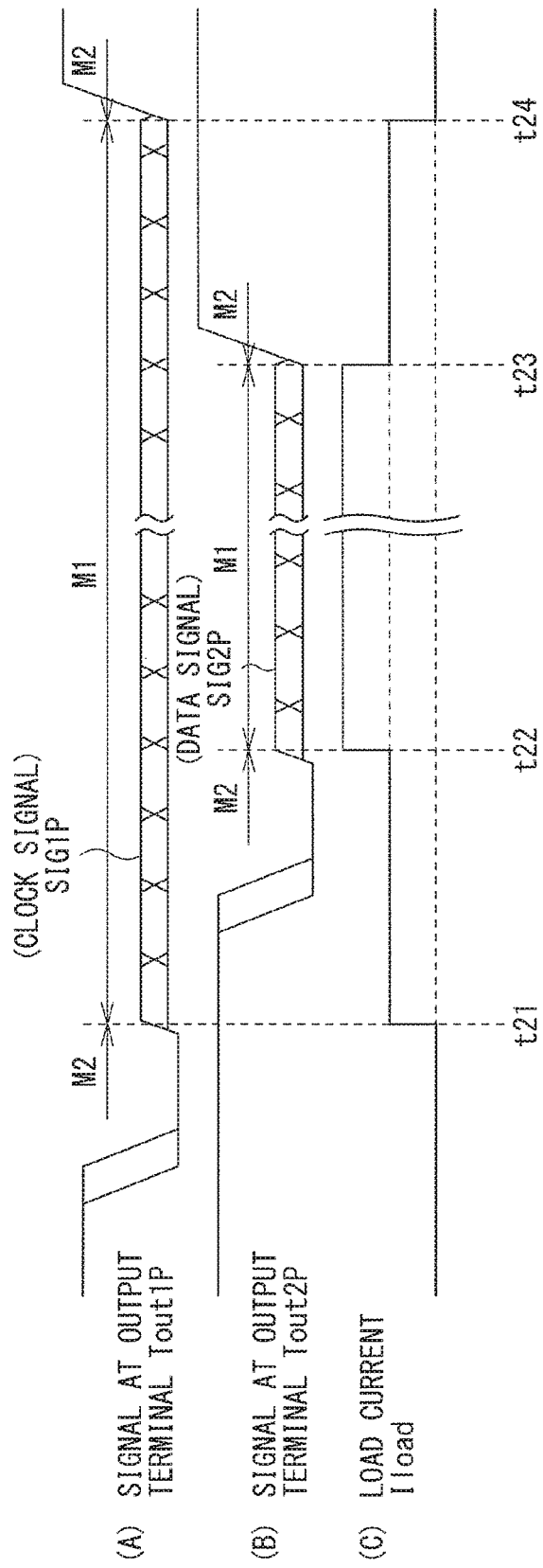
[FIG. 8]

[ FIG. 9A ]
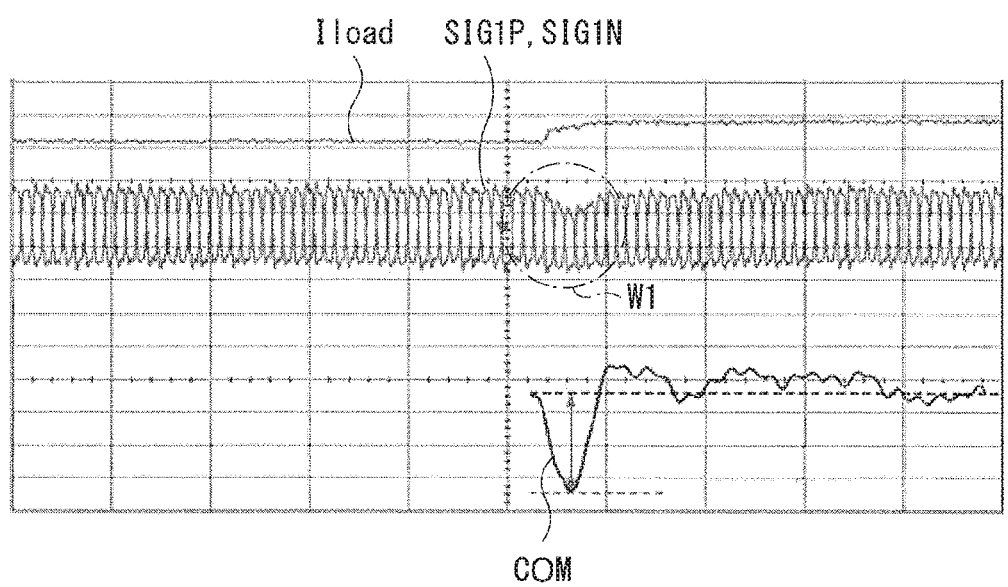
[ FIG. 9B ]
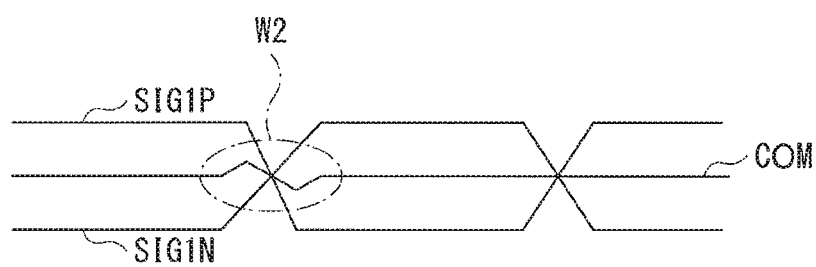

[FIG. 10]
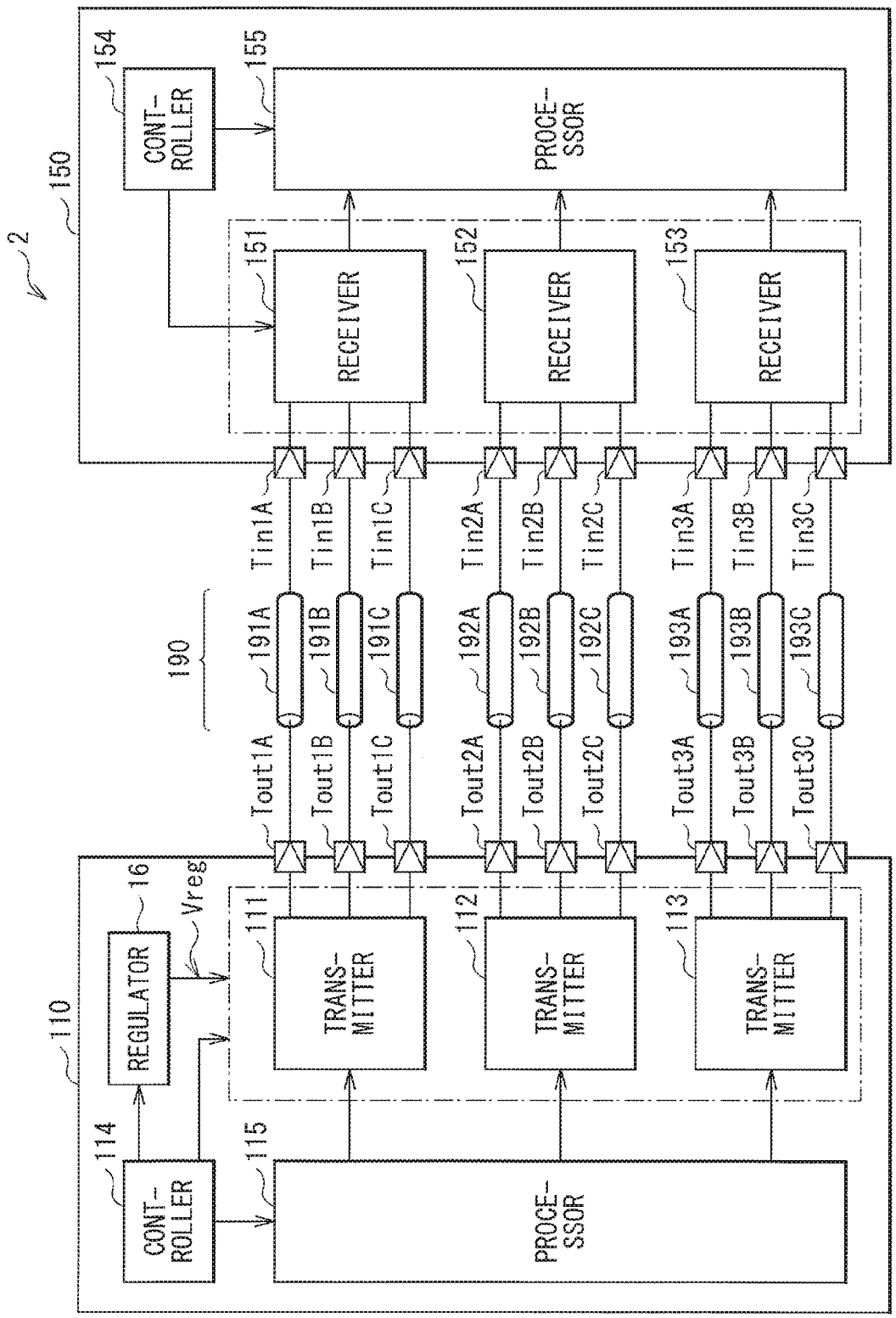

[ FIG. 11 ]
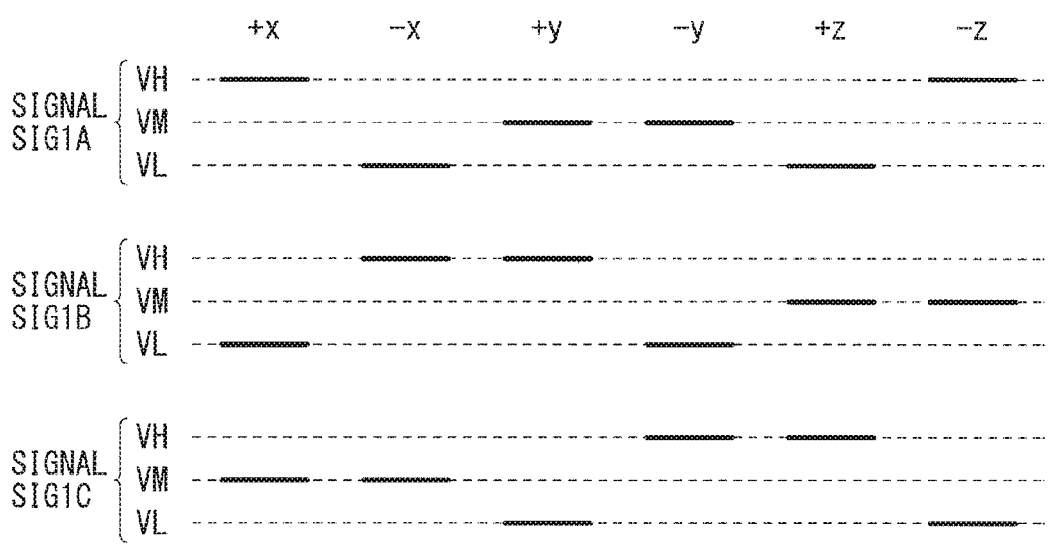

[FIG. 12]
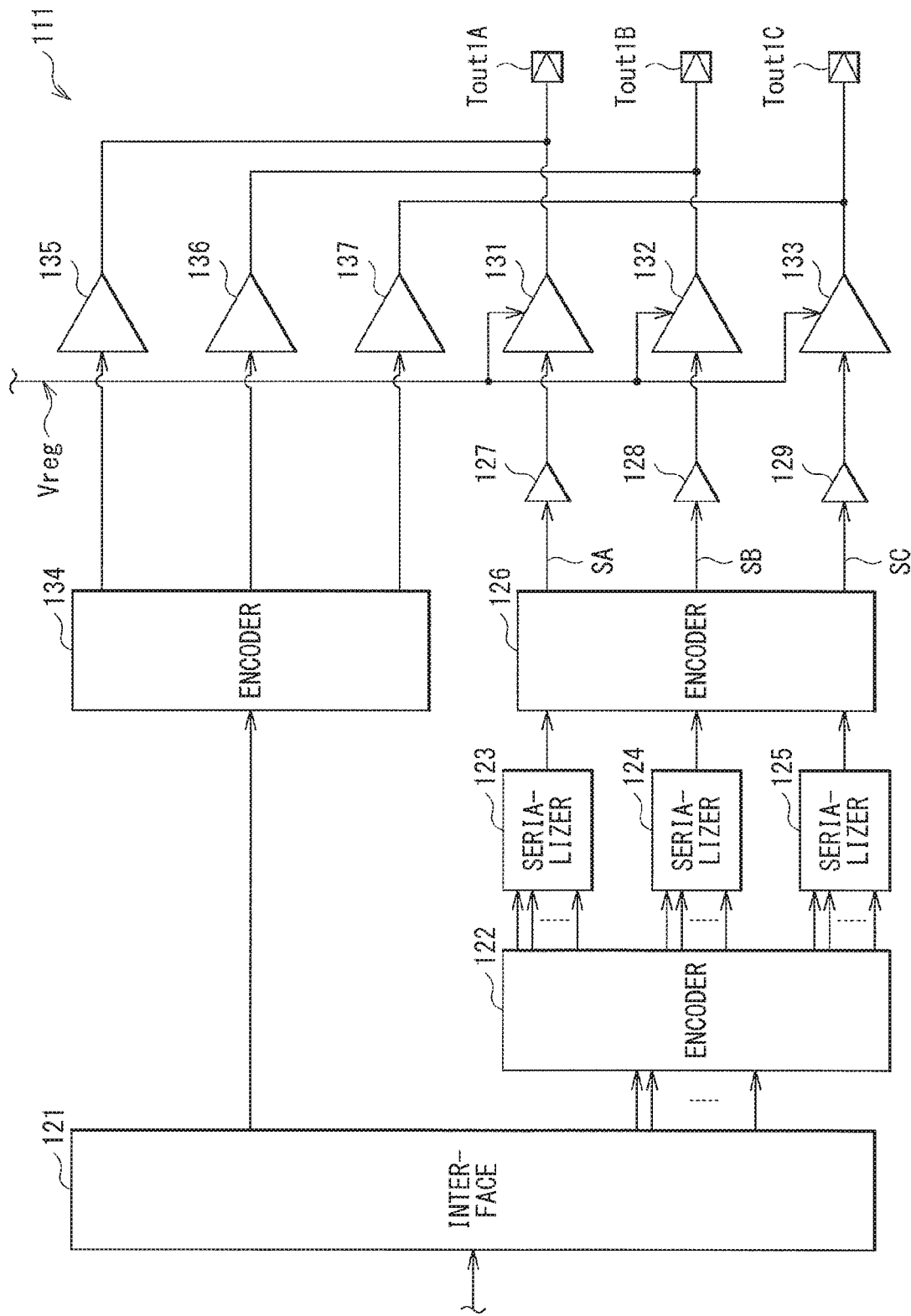

[ FIG. 13 ]
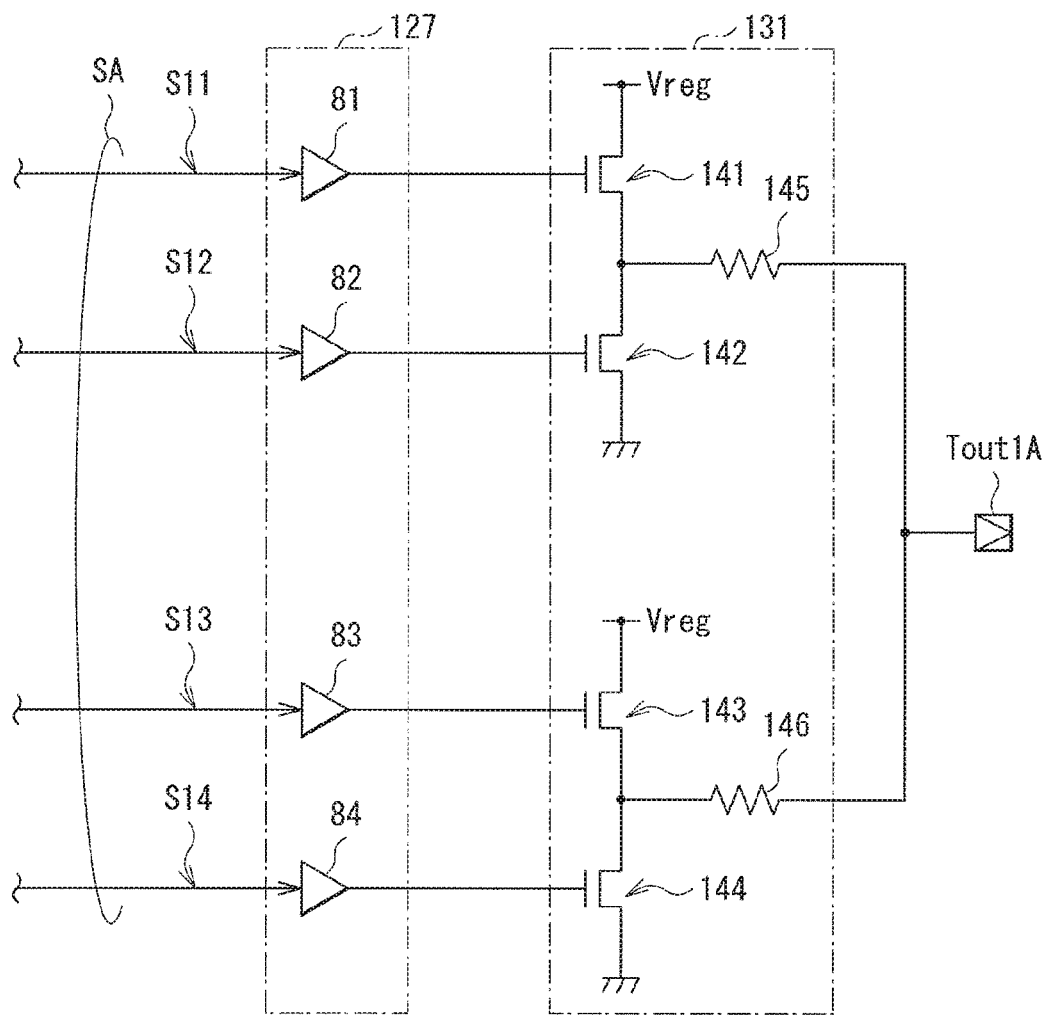

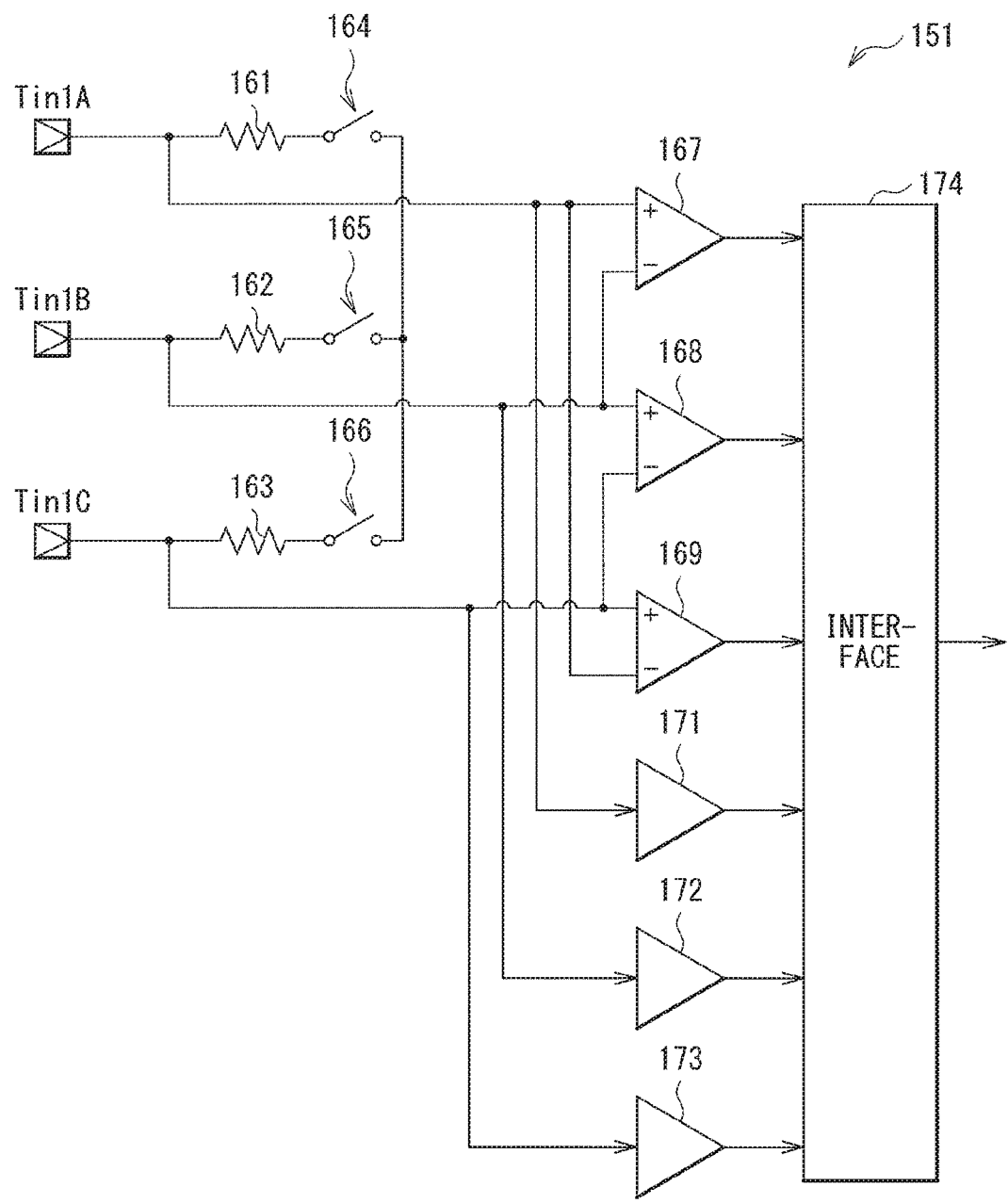
[FIG. 14]

[ FIG. 15 ]
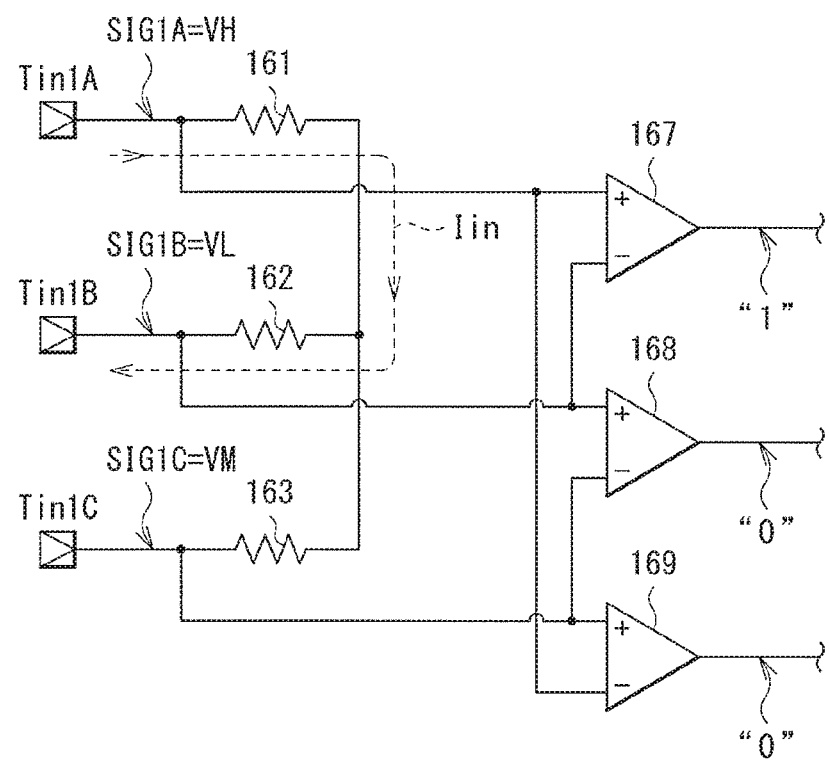

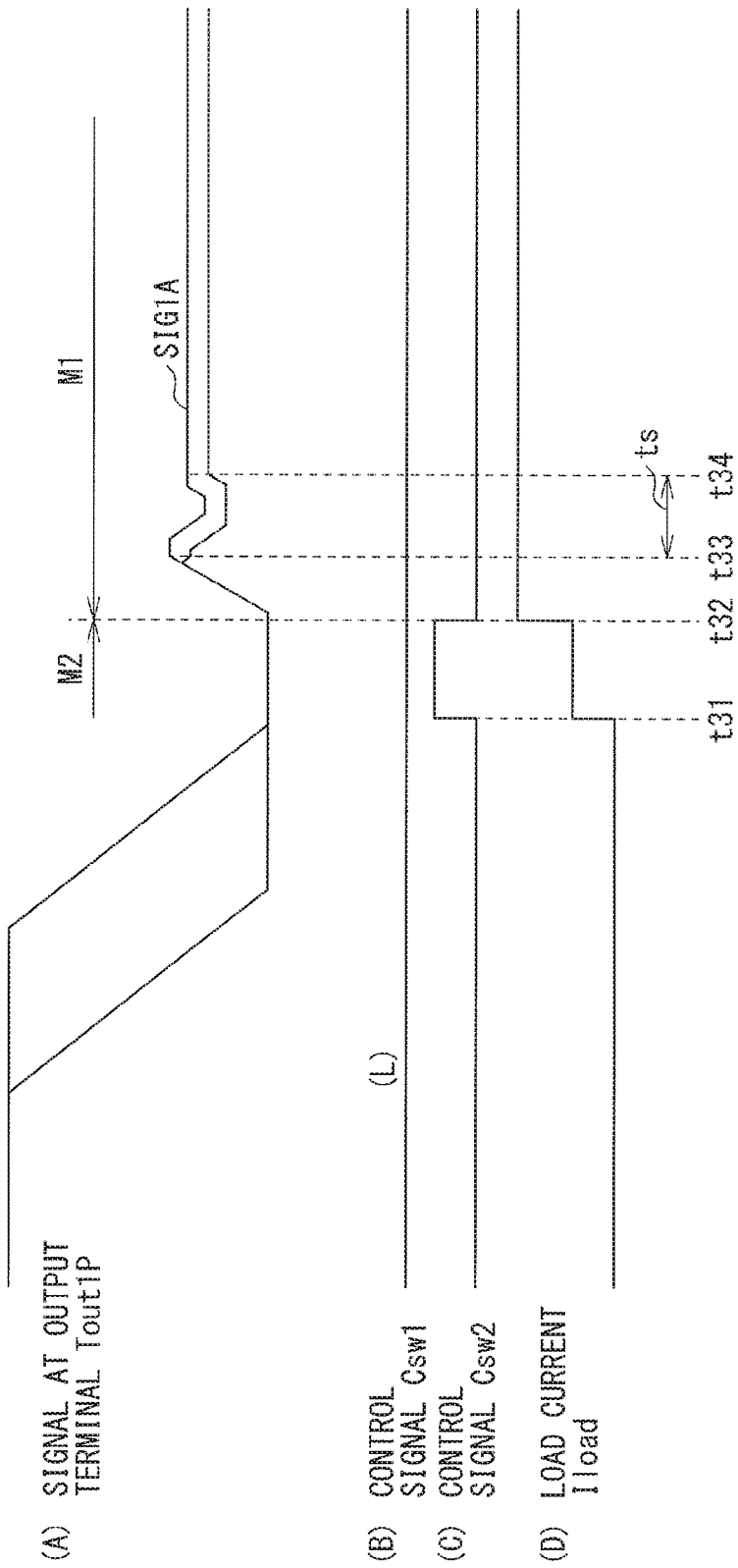
[FIG. 16]

[ FIG. 17 ]
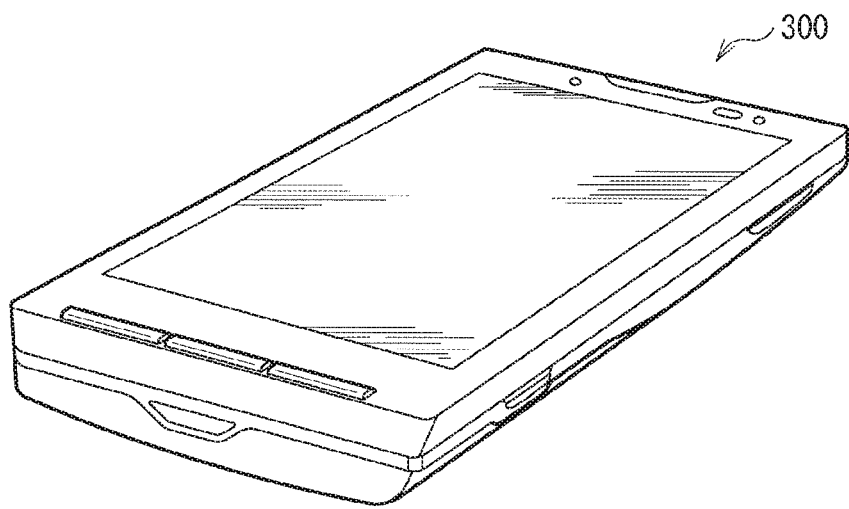

[ FIG. 18 ]
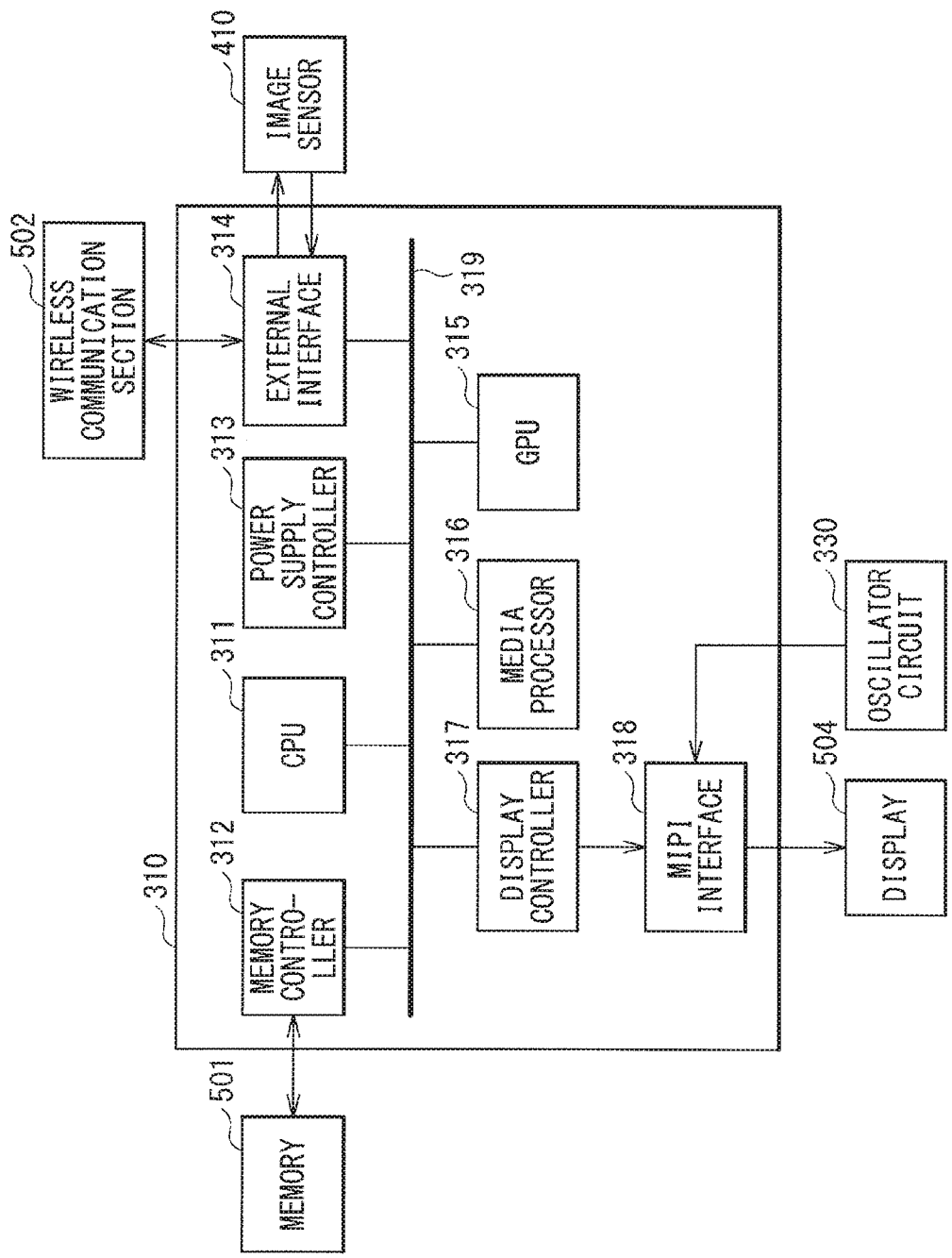

[ FIG. 19 ]
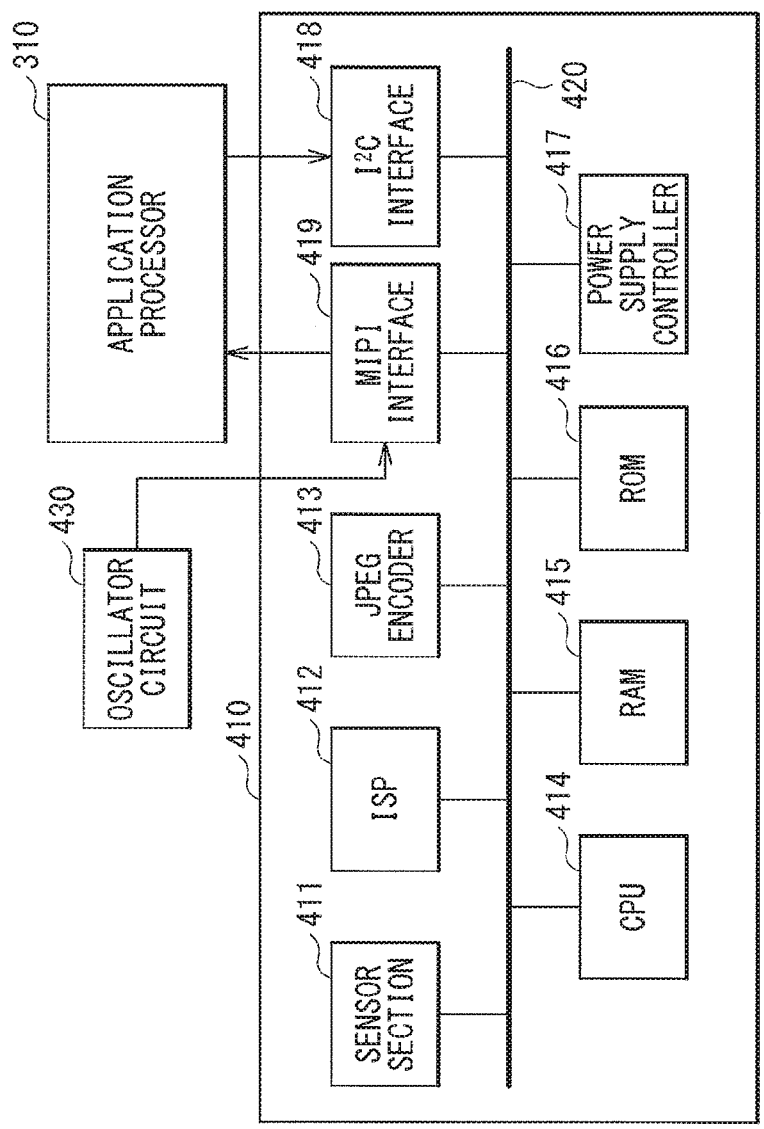

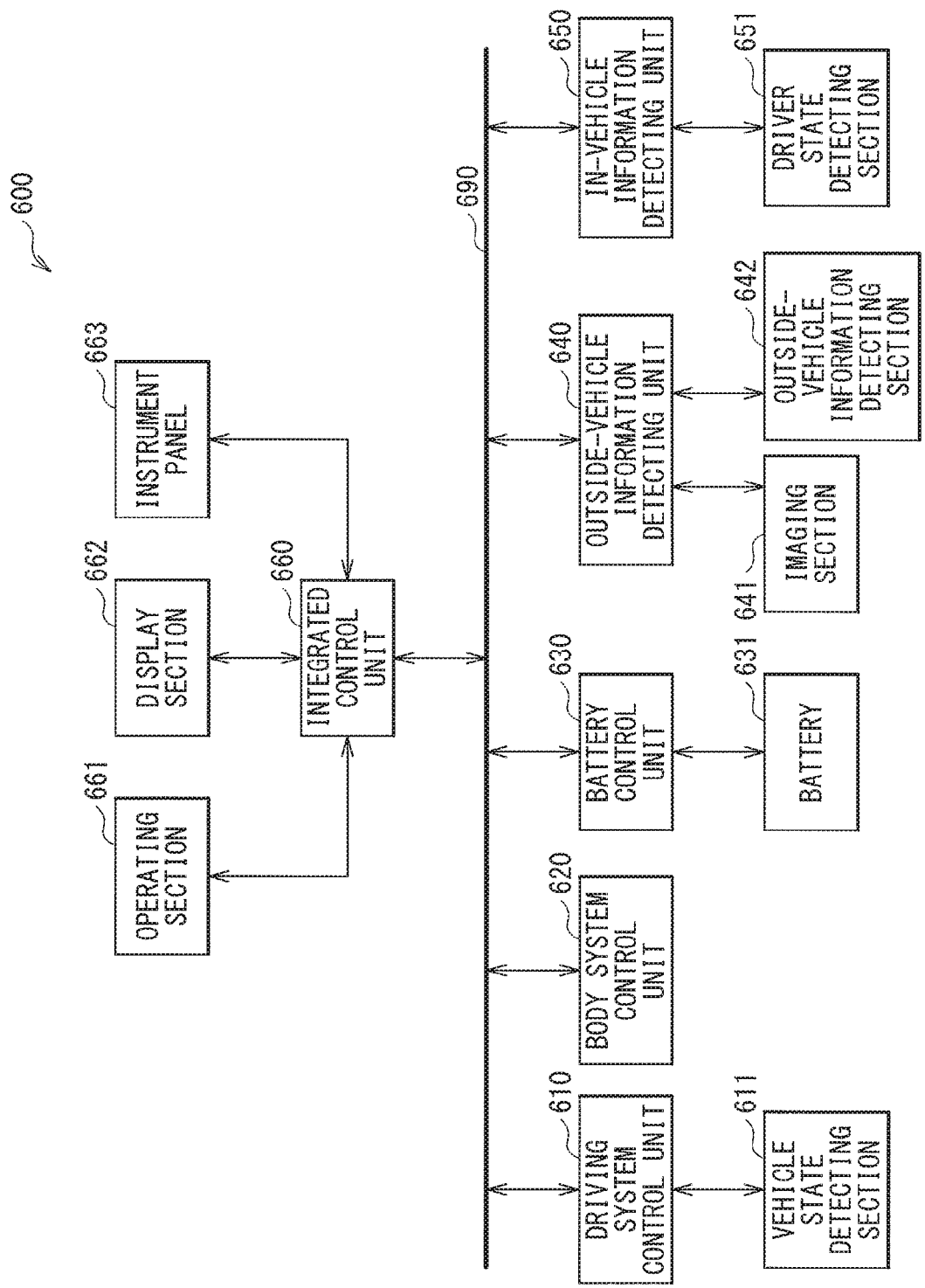
[FIG. 20]

TRANSMISSION DEVICE, TRANSMISSION METHOD, AND COMMUNICATION SYSTEM

TECHNICAL FIELD

The disclosure relates to a transmission device that transmits a signal, a transmission method used in such a transmission device, and a communication system including such a transmission device.

BACKGROUND ART

In association with high functionality and multi-functionality of electronic apparatuses in recent years, the electronic apparatuses are mounted with various devices such as a semiconductor chip, a sensor, and a display device. A lot of pieces of data are exchanged between these devices, and the amount of such data has been increased with high functionality and multi-functionality of the electronic apparatuses. Accordingly, the data are often exchanged with use of a high-speed interface. The high-speed interface is able to transmit and receive data at several Gbps, for example.

There have been disclosed various techniques for a method of further increasing transmission capacity. For example, PTL 1 and PTL 2 each disclose a communication system that transmits three differential signals using three transmission paths.

CITATION LIST

Patent Literature

PTL1: Japanese Unexamined Patent Application Publication No. H06-261092
PTL2: U.S. Pat. No. 8,064,535

SUMMARY OF THE INVENTION

Meanwhile, for electronic apparatuses, suppression of electro-magnetic interference (EMI) is generally desired, and further reduction in electro-magnetic interference is expected.

It is desirable to provide a transmission device, a transmission method, and a communication system that make it possible to reduce a possibility that electro-magnetic interference may occur.

A transmission device according to an embodiment of the disclosure includes a power supply section, a first transmitter, and a controller. The power supply section includes a voltage generator that generates a power supply voltage, and a load section configured to be able to change a load current at the voltage generator. The first transmitter has a first operation mode and a second operation mode, and transmits, in the first operation mode, a first signal on the basis of the power supply voltage. The controller controls an operation of the load section when an operation mode of the first transmitter transitions between the first operation mode and the second operation mode.

A transmission method according to an embodiment of the disclosure includes: causing a voltage generator to generate a power supply voltage: causing a first transmitter, when operating in a first operation mode, to transmit a first signal on the basis of the power supply voltage; and controlling a load current at the voltage generator when an operation mode of the first transmitter transitions between the first operation mode and a second operation mode.

A communication system according to an embodiment of the disclosure includes a transmission device and a reception device. The transmission device includes a power supply section, a first transmitter, and a controller. The power supply section includes a voltage generator that generates a power supply voltage, and a load section configured to be able to change a load current at the voltage generator. The first transmitter has a first operation mode and a second operation mode, and transmits, in the first operation mode, a first signal on the basis of the power supply voltage. The controller controls an operation of the load section when an operation mode of the first transmitter transitions between the first operation mode and the second operation mode.

In the transmission device, the transmission method, and the communication system according to the embodiments of the disclosure, the voltage generator generates the power supply voltage, and the first transmitter sets the operation mode. Then, the first transmitter transmits, in the first operation mode, the first signal on the basis of the power supply voltage. The load current at the voltage generator is controlled when the operation mode of the first transmitter transitions between the first operation mode and the second operation mode.

In the transmission device, the transmission method, and the communication system according to the embodiments of the disclosure, the load current at the voltage generator is controlled when the operation mode of the first transmitter transitions between the first operation mode and the second operation mode, thus making it possible to reduce a possibility that electro-magnetic interference may occur. It is to be noted that the effects described here are not necessarily limitative, and may have any of the effects described in the disclosure.

BRIEF DESCRIPTION OF DRAWINGS

FIG. 1 is a block diagram illustrating a configuration example of a communication system according to a first embodiment of the disclosure.

FIG. 2 is a circuit diagram illustrating a configuration example of a regulator illustrated in FIG. 1.

FIG. 3 is a block diagram illustrating a configuration example of a transmitter illustrated in FIG. 1.

FIG. 4 is a circuit diagram illustrating a configuration example of a pre-driver section and a driver section that are illustrated in FIG. 3.

FIG. 5 is a block diagram illustrating a configuration example of a receiver illustrated in FIG. 1.

FIG. 6 is a timing waveform chart illustrating an example of an operation of the communication system illustrated in FIG. 1.

FIG. 7 is a timing waveform chart illustrating an example of another operation of the communication system illustrated in FIG. 1.

FIG. 8 is a timing waveform chart illustrating an example of an operation of a communication system according to a comparative example.

FIG. 9A describes a fluctuation in a common mode voltage.

FIG. 9B is another diagram describing a fluctuation in the common mode voltage.

FIG. 10 is a block diagram illustrating a configuration example of a communication system according to a second embodiment.

FIG. 11 describes an example of a signal transmitted and received by the communication system illustrated in FIG. 10.

FIG. 12 is a block diagram illustrating a configuration example of a transmitter illustrated in FIG. 10.

FIG. 13 is a circuit diagram illustrating a configuration example of a pre-driver section and a driver section that are illustrated in FIG. 10.

FIG. 14 is a block diagram illustrating a configuration example of a receiver illustrated in FIG. 10.

FIG. 15 describes an example of a receiving operation of the receiver illustrated in FIG. 14.

FIG. 16 is a timing waveform chart illustrating an example of an operation of the communication system illustrated in FIG. 10.

FIG. 17 is a perspective view illustrating an appearance configuration of a smartphone to which a communication system according to an embodiment is applied.

FIG. 18 is a block diagram illustrating a configuration example of an application processor to which a communication system according to an embodiment is applied.

FIG. 19 is a block diagram illustrating a configuration example of an image sensor to which a communication system according to an embodiment is applied.

FIG. 20 is a block diagram illustrating a configuration example of a vehicle control system to which a communication system according to an embodiment is applied.

MODES FOR CARRYING OUT THE INVENTION

In the following, some embodiments of the disclosure are described in detail with reference to the drawings. It is to be noted that descriptions are given in the following order:
1. First Embodiment
2. Second Embodiment
3. Application Examples
1. <First Embodiment>
[Configuration Example]

FIG. 1 illustrates a configuration example of a communication system (communication system 1) according to a first embodiment. The communication system 1 is configured to be able to selectively transmit a differential signal and a single-ended signal. It is to be noted that the transmission method according to an embodiment of the disclosure is embodied by the present embodiment and thus is described together.

The communication system 1 includes a transmission device 10, a transmission path 90, and a reception device 50. The communication system 1 transmits a signal from the transmission device 10 to the reception device 50 via the transmission path 90. The transmission device 10 includes output terminals Tout1P and Tout1N, output terminals Tout2P and Tout2N, and output terminals Tout3P and Tout3N. The transmission path 90 includes lines 91P and 91N, lines 92P and 92N, and lines 93P and 93N. The reception device 50 includes input terminals Tin1P and Tin1N, input terminals Tin2P and Tin2N, and input terminals Tin3P and Tin3N. The output terminal Tout1P of the transmission device 10 and the input terminal Tin1P of the reception device 50 are coupled to each other via the line 91P. The output terminal Tout1N of the transmission device 10 and the input terminal Tin1N of the reception device 50 are coupled to each other via the line 91N. Likewise, the output terminal Tout2P of the transmission device 10 and the input terminal Tin2P of the reception device 50 are coupled to each other via the line 92P. The output terminal Tout2N of the transmission device 10 and the input terminal Tin2N of the reception device 50 are coupled to each other via the line 92N. In addition, the output terminal Tout3P of the transmission device 10 and the input terminal Tin3P of the reception device 50 are coupled to each other via the line 93P. The output terminal Tout3N of the transmission device 10 and the input terminal Tin3N of the reception device 50 are coupled to each other via the line 93N. In this example, the lines 91P, 91N, 92P, 92N, 93P, and 93N each have a characteristic impedance of about 50[Ω].

(Transmission Device 10)

The transmission device 10 includes a controller 14, a regulator 16, a processor 15, and transmitters 11, 12, and 13.

The controller 14 controls operations in the transmission device 10. Specifically, the controller 14 sets an operation mode for each of the transmitters 11, 12, and 13. Each of the transmitters 11, 12, and 13 has two operation modes M1 and M2.

The operation mode M1 is a mode (differential signal transmission mode) in which, for example, captured data, etc. are transmitted using differential signals at a bit rate of 2.5 [Gbps], for example. Specifically, as described later, in a case where the transmitter 11 operates in the operation mode M1, the transmitter 11 transmits a differential signal (signals SIG1P and SIG1N) via the output terminals Tout1P and Tout1N. Likewise, in a case where the transmitter 12 operates in the operation mode M1, the transmitter 12 transmits a differential signal (signals SIG2P and SIG2N) via the output terminals Tout2P and Tout2N. In addition, in a case where the transmitter 13 operates in the operation mode M1, the transmitter 13 transmits a differential signal (signals SIG3P and SIG3N) via the output terminals Tout3P and Tout3N. In other words, in the operation mode M1, the lines 91P and 91N correspond to one transmission lane L through which the differential signal (signals SIG1P and SIG1N) are transmitted. The lines 92P and 92N correspond to one transmission lane L through which the differential signal (signals SIG2P and SIG2N) are transmitted. The lines 93P and 93N correspond to one transmission lane L through which the differential signal (signals SIG3P and SIG3N) are transmitted.

The operation mode M2 is a mode (single-ended signal transmission mode) in which control data, etc. are transmitted using a single-ended signal at a bit rate of 10 [Mbps], for example. Specifically, as described later, in a case where the transmitter 11 operates in the operation mode M2, the transmitter 11 transmits the single-ended signal via each of the output terminals Tout1P and Tout1N. Likewise, in a case where the transmitter 12 operates in the operation mode M2, the transmitter 12 transmits the single-ended signal via each of the output terminals Tout2P and Tout2N. In addition, in a case where the transmitter 13 operates in the operation mode M2, the transmitter 13 transmits the single-ended signal via each of the output terminals Tout3P and Tout3N.

Each of the transmitters 11, 12, and 13 has two such operation modes M1 and M2. The controller 14 selectively sets the operation mode of each of the transmitters 11, 12, and 13 to one of these two operation modes M1 and M2.

In addition, as described later, for example, the controller 14 also has a function of controlling an operation of the regulator 16 to moderately change a load current Iload at a voltage generator 20 (described later) in the regulator 16 when the operation mode of each of the transmitters 11, 12, and 13 transitions between the operation mode M1 and the operation mode M2.

The regulator 16 generates a voltage Vreg on the basis of a control signal supplied from the controller 14, and supplies the voltage Vreg to the transmitters 11, 12, and 13.

FIG. 2 illustrates an example of an operation of the regulator 16. FIG. 2 also illustrates the controller 14 for convenience of description. The regulator 16 includes the voltage generator 20, variable resistors 23 and 25, switches 24 and 26, and a control signal generator 27.

The voltage generator 20 generates the voltage Vreg. The voltage generator 20 includes a reference voltage generator 21 and an operational amplifier 22. The reference voltage generator 21 includes, for example, a bandgap reference circuit, and generates a reference voltage Vreg1 that corresponds to the voltage Vreg. The operational amplifier 22 has a positive input terminal supplied with the reference voltage Vreg1, and has a negative input terminal coupled to an output terminal. This configuration causes the operational amplifier 22 to operate as a voltage follower and to output the voltage Vreg.

Each of the variable resistors 23 and 25 is configured to be able to change a resistance value on the basis of control signals Cr1 and Cr2 supplied from the control signal generator 27. The variable resistor 23 has one end coupled to the output terminal and the negative input terminal of the operational amplifier 22, and has another end coupled to one end of the switch 24, with a control terminal supplied with the control signal Cr1. The variable resistor 25 has one end coupled to the output terminal and the negative input terminal of the operational amplifier 22, and has another end coupled to one end of the switch 26, with a control terminal supplied with the control signal Cr2.

The switches 24 and 26 are turned on and off on the basis of the control signals Csw1 and Csw2 supplied from the control signal generator 27. The switch 24 has one end coupled to the other end of the variable resistor 23, and has another end grounded, with a control terminal supplied with the control signal Csw1. The switch 26 has one end coupled to the other end of the variable resistor 25, and has another end grounded, with a control terminal supplied with the control signal Csw2.

The control signal generator 27 generates the control signals Cr1 and Cr2 and the control signals Csw1 and Csw2, on the basis of the control signal supplied from the controller 14. Then, the control signal generator 27 supplies the control signals Cr1 and Cr2, respectively, to the variable resistors 23 and 25 while supplying the control signals Csw1 and Csw2, respectively, to the switches 24 and 26.

In accordance with this configuration, as described later, for example, in a case where the operation mode transitions from the operation mode M2 (single-ended signal transmission mode) to the operation mode M1 (differential signal transmission mode), the control signal generator 27 serially turns on the switches 24 and 26 using the control signals Csw1 and Csw2 on the basis of the control signal supplied from the controller 14. In addition, for example, in a case where the operation mode transitions from the operation mode M1 to the operation mode M2, the control signal generator 27 serially turns off the switches 24 and 26 using the control signals Csw1 and Csw2 on the basis of the control signal supplied from the controller 14. This enables the regulator 16 to moderately change the load current Iload at the voltage generator 20.

In addition, the control signal generator 27 adjusts the resistance value of each of the variable resistors 23 and 25 using the control signals Cr1 and Cr2. This enables the regulator 16 to adjust an amount of current that flows to each of the switches 24 and 26 when the switches 24 and 26 are turned on.

The processor 15 performs processing corresponding to the operation mode of each of the transmitters 11, 12, and 13 on the basis of the control signal supplied from the controller 14, and supplies a signal to each of the transmitters 11, 12, and 13.

The transmitter 11 generates, in the operation mode M1 (differential signal transmission mode), the differential signal (signals SIG1P and SIG1N) on the basis of the signal supplied from the processor 15, and generates, in the operation mode M2 (single-ended signal transmission mode), the single-ended signal on the basis of the signal supplied from the processor 15. Then, the transmitter 11 transmits the generated signals via the output terminals Tout1P and Tout1N. Likewise, the transmitter 12 generates, in the operation mode M1, the differential signal (signals SIG2P and SIG2N) on the basis of the signal supplied from the processor 15, generates, in the operation mode M2, the single-ended signal on the basis of the signal supplied from the processor 15, and transmits the generated signals via the output terminals Tout2P and Tout2N. In addition, the transmitter 13 generates, in the operation mode M1, the differential signal (signals SIG3P and SIG3N) on the basis of the signal supplied from the processor 15, generates, in the operation mode M2, the single-ended signal on the basis of the signal supplied from the processor 15, and transmits the generated signals via the output terminals Tout3P and Tout3N.

FIG. 3 illustrates a configuration example of the transmitter 11. It is to be noted that the same applies to the transmitters 12 and 13. The transmitter 11 includes an interface 31, a serializer 32, pre-driver sections 33 and 34, driver sections 35 and 36, an encoder 37, and driver sections 38 and 39.

The interface 31 supplies signals to the encoder 37 and the serializer 32 on the basis of the signals supplied from the controller 14 and the processor 15. Specifically, the interface 31 supplies the signals to the serializer 32 in a case where the transmitter 11 operates in the operation mode M1 (differential signal transmission mode), and supplies the signal to the encoder 37 in a case where the transmitter 11 operates in the operation mode M2 (single-ended signal transmission mode).

The serializer 32 generates a signal SP that is a serial signal and a signal SN that is an inverted signal of the signal SP by serializing the signals (parallel signals) supplied from the interface 31. Then, the serializer 32 supplies the signal SP to the pre-driver section 33 while supplying the signal SN to the pre-driver section 34.

The pre-driver section 33 drives the driver section 35 on the basis of the signal SP. The pre-driver section 34 drives the driver section 36 on the basis of the signal SN.

The driver section 35 generates the signal SIG1P on the basis of the signal supplied from the pre-driver section 33 in a case where the transmitter 11 operates in the operation mode M1 (differential signal transmission mode). The driver section 36 generates the signal SIG1N on the basis of the signal supplied from the pre-driver section 34 in a case where the transmitter 11 operates in the operation mode M1.

FIG. 4 illustrates a configuration example of the pre-driver sections 33 and 34 and the driver sections 35 and 36. Each of the pre-driver sections 33 and 34 includes pre-drivers 41 and 42. Each of the driver sections 35 and 36 includes transistors 43 and 44, and a resistor 45. In this example, each of the transistors 43 and 44 is an N-channel metal oxide semiconductor (MOS) field effect transistor (FET). In this example, each of the signals SP and SN is a differential signal including signals S1 and S2.

In the pre-driver section 33, the pre-driver 41 drives the transistor 43 in the driver section 35 on the basis of the signal S1. The pre-driver 42 drives the transistor 44 in the driver section 35 on the basis of the signal S2.

In the pre-driver section 34, the pre-driver 41 drives the transistor 43 in the driver section 36 on the basis of the signal S2. The pre-driver 42 drives the transistor 44 in the driver section 36 on the basis of the signal S1.

In the driver section 35, the transistor 43 has a drain supplied with the voltage Vreg, and has a gate supplied with an output signal from the pre-driver 41 in the pre-driver section 33, with a source coupled to a drain of the transistor 44 and to one end of the resistor 45. The transistor 44 has the drain coupled to the source of the transistor 43 and to the one end of the resistor 45, and has a gate supplied with an output signal from the pre-driver 42 in the pre-driver section 33, with a source grounded. The resistor 45 has the one end coupled to the source of the transistor 43 and to the drain of the transistor 44, and has another end coupled to the output terminal Tout1P. In this example, a sum of a resistance value of the resistor 45 and a resistance value of the transistor 43 in an ON-state is about 50[Ω]. Likewise, a sum of the resistance value of the resistor 45 and the resistance value of the transistor 44 in an ON-state is about 50[Ω]. The same applies to the driver section 36.

In accordance with this configuration, for example, in a case where the signal S1 is at high level and the signal S2 is at low level, the transistor 43 is turned on while the transistor 44 is turned off in the driver section 35. At this time, in the driver section 36, the transistor 43 is turned off while the transistor 44 is turned on. The output terminal Tout1P and the output terminal Tout1N, as described later, are coupled to each other via the lines 91P and 91N and a termination resistor of the reception device 50. As a result, a voltage at the output terminal Tout1P becomes a high-level voltage VH while a voltage at the output terminal Tout1N becomes a low-level voltage VL.

In addition, for example, in a case where the signal S1 is at low level and the signal S1 is at high level, the transistor 43 is turned off while the transistor 44 is turned on in the driver section 35. At this time, in the driver section 36, the transistor 43 is turned on while the transistor 44 is turned off. As a result, the voltage at the output terminal Tout1P becomes the low-level voltage VL while the voltage at the output terminal Tout1N becomes the high-level voltage VH.

It is to be noted that the driver sections 35 and 36 are each configured to turn off both of the transistors 43 and 44 in a case where the transmitter 11 operates in the operation mode M2 (single-ended signal transmission mode). This enables the driver sections 35 and 36 to set an output impedance to a high impedance in the operation mode M2.

The encoder 37 generates two signals by performing predetermined encoding processing on the basis of the signal supplied from the interface 31, and supplies these two signals to the respective driver sections 38 and 39.

The driver section 38 generates a single-ended signal on the basis of the signal supplied from the encoder 37 in a case where the transmitter 11 operates in the operation mode M2 (single-ended signal transmission mode). The driver section 39 generates a single-ended signal on the basis of the signal supplied from the encoder 37 in a case where the transmitter 11 operates in the operation mode M2. It is to be noted that each of the driver sections 38 and 39 sets the output impedance to a high impedance in a case where the transmitter 11 operates in the operation mode M1 (differential signal transmission mode).

(Reception Device 50)

The reception device 50, as illustrated in FIG. 1, includes a controller 54, receivers 51, 52, and 53, and a processor 55.

The controller 54 controls operations in the reception device 50. In addition, as described later, the controller 54 also has a function of controlling turning on and off of the termination resistor by supplying the control signal to the receivers 51, 52, and 53.

In a case where the transmitter 11 operates in the operation mode M1 (differential signal transmission mode), the receiver 51 receives, via the input terminals Tin1P and Tin1N, the differential signal (signals SIG1P and SIG1N) transmitted by the transmitter 11. In a case where the transmitter 11 operates in the operation mode M2 (single-ended signal transmission mode), the receiver 51 receives, via each of the input terminals Tin1P and Tin1N, the single-ended signal transmitted by the transmitter 11. Likewise, in a case where the transmitter 12 operates in the operation mode M1, the receiver 52 receives, via the input terminals Tin2P and Tin2N, the differential signal (signals SIG2P and SIG2N) transmitted by the transmitter 12. In a case where the transmitter 12 operates in the operation mode M2, the receiver 52 receives, via each of the input terminals Tin2P and Tin2N, the single-ended signal transmitted by the transmitter 12. In addition, in a case where the transmitter 13 operates in the operation mode M1, the receiver 53 receives, via the input terminals Tin3P and Tin3N, the differential signal (signals SIG3P and SIG3N) transmitted by the transmitter 13. In a case where the transmitter 13 operates in the operation mode M2, the receiver 53 receives, via each of the input terminals Tin3P and Tin3N, the single-ended signal transmitted by the transmitter 13.

FIG. 5 illustrates a configuration example of the receiver 51. It is to be noted that the same applies to the receivers 52 and 53. The receiver 51 includes a resistor 61, switches 62 and 63, a receiver 64, and receivers 65 and 66.

The resistor 61 functions as a termination resistor of the communication system 1, and has a resistance value of about 100[Ω] in this example. The resistor 61 has one end coupled to another end of the switch 62, and has another end coupled to another end of the switch 63. The switch 62 has one end coupled to the input terminal Tin1A, and has the other end coupled to the one end of the resistor 61. The switch 63 has one end coupled to the input terminal Tin1B, and has the other end coupled to the other end of the resistor 61. The switches 62 and 63 are turned on and off on the basis of the control signal supplied from the controller 54. Specifically, the switches 62 and 63 are turned on when the transmitter 11 operates in the operation mode M1 and the receiver 51 receives the differential signal (signals SIG1P and SIG1N). In addition, the switches 62 and 63 are turned off when the transmitter 11 operates in the operation mode M2 and the receiver 51 receives the single-ended signal.

The receiver 64 receives the differential signal (signals SIG1P and SIG1N) in a case where the transmitter 11 operates in the operation mode M (differential signal transmission mode). The receiver 64 has a positive input terminal coupled to the one end of the switch 62 and to the input terminal Tin1P, and has a negative input terminal to the one end of the switch 63 and to the input terminal Tin1N.

The receiver 65 receives the single-ended signal in a case where the transmitter 11 operates in the operation mode M2 (single-ended signal transmission mode). The receiver 65 has an input terminal coupled to the one end of the switch 62 and to the input terminal Tin1P. Likewise, the receiver 66 receives the single-ended signal in a case where the transmitter 11 operates in the operation mode M2, and has an input terminal coupled to the one end of the switch 63 and to the input terminal Tin1N.

An interface 67 supplies, to the processor 55, the signals received by the receiver 64 and the receivers 65 and 66.

The processor 55 (FIG. 1) performs predetermined processing on the basis of the signal received by each of the receivers 51, 52, and 53 and the control signal supplied from the controller 54.

Here, the regulator 16 corresponds to a specific example of a "power supply section" in the disclosure. The variable resistors 23 and 25 and the switches 24 and 26 correspond to a specific example of a "load section" in the disclosure. The controller 14 and the control signal generator 27 correspond to a specific example of a "controller" in the disclosure. The operation mode M1 corresponds to a specific example of a "first operation mode" in the disclosure. The operation mode M2 corresponds to a specific example of a "second operation mode" in the disclosure.

[Workings and Effects]

Workings and effects of the communication system 1 according to the present embodiment are subsequently described.

(Overview of Overall Operation)

First, an overview of an overall operation of the communication system 1 is described with reference to FIGS. 1 and 2. In the transmission device 10, the controller 14 controls the operation in the transmission device 10. Specifically, the controller 14 selectively sets the operation mode of each of the transmitters 11, 12, and 13 to one of the two operation modes M1 and M2. In addition, the controller 14 controls the operation of the regulator 16 to moderately change the load current Iload at the voltage generator 20 in the regulator 16 (FIG. 2) when the operation mode transitions between the operation mode M1 and the operation mode M2. The regulator 16 generates the voltage Vreg on the basis of the control signal supplied from the controller 14, and supplies the voltage Vreg to the transmitters 11, 12, and 13. The processor 15 performs processing corresponding to the operation mode of each of the transmitters 11, 12, and 13 on the basis of the control signal supplied from the controller 14, and supplies a signal to each of the transmitters 11, 12, and 13. The transmitter 11 generates, in the operation mode M1 (differential signal transmission mode), the differential signal (signals SIG1P and SIG1N) on the basis of the signal supplied from the processor 15, and generates, in the operation mode M2 (single-ended signal transmission mode), the single-ended signal on the basis of the signal supplied from the processor 15. The same applies to the transmitters 12 and 13.

In the reception device 50, the controller 54 controls the operations in the reception device 50. The receiver 51 receives the differential signal (signals SIG1P and SIG1N) transmitted by the transmitter 11 in a case where the transmitter 11 operates in the operation mode M1 (differential signal transmission mode). In addition, the receiver 51 receives the single-ended signal transmitted by the transmitter 11 in a case where the transmitter 11 operates in the operation mode M2 (single-ended signal transmission mode). The same applies to the receivers 52 and 53. The processor 55 performs predetermined processing on the basis of the signals received by the receivers 51, 52, and 53 and the control signal supplied from the controller 54.

(Detailed Operation)

The controller 14 selectively sets the operation mode of each of the transmitters 11, 12, and 13 to one of the two operation modes M1 and M2. For example, in a case of operating the three transmitters 11, 12, and 13 in the operation mode M1, the controller 14 causes one of the three transmitters 11, 12, and 13 to transmit a clock signal, and causes the other two to transmit a data signal. In addition, for example, in a case of operating two of the three transmitters 11, 12, and 13 in the operation mode M1, the controller 14 causes one of the two transmitters to transmit the clock signal and causes the other to transmit the data signal. First, description is given below of a case of operating the three transmitters 11, 12, and 13 in the operation mode M1. Next, description is given of a case of operating two of the three transmitters 11, 12, and 13 in the operation mode M1.

FIG. 6 illustrates an example of an operation in a case of operating the three transmitters 11, 12, and 13 in the operation mode M1. (A) of FIG. 6 illustrates a waveform of a signal at the output terminal Tout1P. (B) of FIG. 6 illustrates a waveform of a signal at the output terminal Tout2P. (C) of FIG. 6 illustrates a waveform of the control signal Csw1 in the regulator 16. (D) of FIG. 6 illustrates a waveform of the control signal Csw2 in the regulator 16. (E) of FIG. 6 illustrates a waveform of the load current Iload at the voltage generator 20. It is to be noted that the signal at the output terminal Tout1N is similar to the signal at the output terminal Tout1P ((A) of FIG. 6), and the signal at each of the output terminals Tout2N, Tout3P, and Toupt3N is similar to the signal at the output terminal Tout2P ((B) of FIG. 6). In this example, the transmitter 11 transmits the clock signal, and each of the transmitters 12 and 13 transmits the data signal.

First, the controller 14 controls the transmitter 11 to thereby start transmitting the differential signal (signals SIG1P and SIG1N) as the clock signals, and then controls the transmitters 12 and 13 to thereby start transmitting the differential signal (signals SIG2P and SIG2N) as the data signals and the differential signal (signals SIG3P and SIG3N) as the data signals. Thereafter, the controller 14 controls the transmitters 12 and 13 to thereby stop transmitting the differential signal (signals SIG2P and SIG2N) as the data signals and the differential signal (signals SIG3P and SIG3N) as the data signals, and then controls the transmitter 11 to thereby stop transmitting the differential signal (signals SIG1P and SIG1N) as the clock signals. This operation is described in detail below.

First, at timing t1, the controller 14 causes the operation mode of the transmitter 11 to transition from the operation mode M2 (single-ended signal transmission mode) to the operation mode M1 (differential signal transmission mode). This causes the transmitter 11 to start transmitting the differential signal (signals SIG1P and SIG1N) as the clock signals ((A) of FIG. 6). In response to this, in the regulator 16, the load current Iload at the voltage generator 20 increases ((E) of FIG. 6).

Next, at timing t2, the control signal generator 27 of the regulator 16 changes the control signal Csw1 from low level to high level on the basis of the control signal supplied from the controller 14 ((C) of FIG. 6). This turns on the switch 24 in the regulator 16, to cause a current corresponding to the resistance value of the variable resistor 23 to flow to the switch 24. As a result, the load current Iload at the voltage generator 20 increases slightly ((E) of FIG. 6).

Next, at timing t3, the control signal generator 27 of the regulator 16 changes the control signal Csw2 from low level to high level on the basis of the control signal supplied from the controller 14 ((D) of FIG. 6). This turns on the switch 26 in the regulator 16, to cause a current corresponding to the resistance value of the variable resistor 25 to flow to the switch 26. As a result, the load current Iload at the voltage generator 20 increases slightly ((E) of FIG. 6).

Next, at timing t4, the controller 14 causes the operation mode of the transmitters 12 and 13 to transition from the operation mode M2 (single-ended signal transmission mode) to the operation mode M1 (differential signal transmission mode). This causes the transmitter 12 to start transmitting the differential signal (signals SIG2P and SIG2N) as the data signals, and causes the transmitter 13 to start transmitting the differential signal (signals SIG3P and SIG3N) as the data signals ((B) of FIG. 6). At the same time, the control signal generator 27 of the regulator 16 changes the control signals Csw1 and Csw2 from high level to low level on the basis of the control signal supplied from the controller 14 ((C) and (D) of FIG. 6). This turns off both of the switches 24 and 26 in the regulator 16. In this example, an amount of increase in the load current Iload as a result of operating the transmitters 12 and 13 in the operation mode M1 is larger than an amount of decrease in the load current Iload as a result of turning off the switches 24 and 26. As a result, the load current Iload at the voltage generator 20 increases slightly ((E) of FIG. 6).

Next, at timing t5, the controller 14 causes the operation mode of the transmitters 12 and 13 to transition from the operation mode M1 (differential signal transmission mode) to the operation mode M2 (single-ended signal transmission mode). This causes the transmitter 12 to stop transmitting the differential signal (signals SIG2P and SIG2N), and causes the transmitter 13 to stop transmitting the differential signal (signals SIG3P and SIG3N) ((B) of FIG. 6). At the same time, the control signal generator 27 of the regulator 16 changes the control signals Csw1 and Csw2 from low level to high level on the basis of the control signal supplied from the controller 14 ((C) and (D) of FIG. 6). This turns on both of the switches 24 and 26 in the regulator 16. In this example, the amount of decrease in the load current Iload as a result of operating the transmitters 12 and 13 in the operation mode M2 is larger than the amount of increase in the load current Iload as a result of turning on the switches 24 and 26. As a result, the load current load at the voltage generator 20 decreases slightly ((E) of FIG. 6).

Next, at timing t6, the control signal generator 27 of the regulator 16 changes the control signal Csw2 from high level to low level on the basis of the control signal supplied from the controller 14 ((D) of FIG. 6). This turns off the switch 26 in the regulator 16. As a result, the load current Iload at the voltage generator 20 decreases slightly ((E) of FIG. 6).

Next, at timing t7, the control signal generator 27 of the regulator 16 changes the control signal Csw1 from high level to low level on the basis of the control signal supplied from the controller 14 ((C) of FIG. 6). This turns off the switch 24 in the regulator 16. As a result, the load current load at the voltage generator 20 decreases slightly ((E) of FIG. 6).

Then, at timing t8, the controller 14 causes the operation mode of the transmitter 11 to transition from the operation mode M1 (differential signal transmission mode) to the operation mode M2 (single-ended signal transmission mode). This causes the transmitter 11 to stop transmitting the differential signal (signals SIG1P and SIG1N) ((A) of FIG. 6). As a result, the load current Iload at the voltage generator 20 decreases ((E) of FIG. 6).

In this manner, in the transmission device 10, in a case where the transmitter 11 is operating in the operation mode M1 (differential signal transmission mode), the switches 24 and 26 are serially turned on prior to causing the operation mode of the transmitters 12 and 13 to transition from the operation mode M2 (single-ended signal transmission mode) to the operation mode M1. Then, at the timing t4 at which the operation mode of the transmitters 12 and 13 transitions to the operation mode M1, both of the switches 24 and 26 are turned off. In addition, in the transmission device 10, at the timing t5 at which the operation mode of the transmitters 12 and 13 is caused to transition from the operation mode M1 (differential signal transmission mode) to the operation mode M2 (single-ended signal transmission mode), both of the switches 24 and 26 are turned on, and thereafter the switches 24 and 26 are serially turned off. This enables the transmission device 10 to moderately change the load current load at the voltage generator 20, thus making it possible to suppress a fluctuation in the voltage Vreg associated with the change in the load current Iload. As a result, as described later with reference to a comparative example, the transmission device 10 makes it possible to suppress the occurrence of electro-magnetic interference associated with the fluctuation in a common mode voltage COM of the differential signal (signals SIG1P and SIG1N) that are being transmitted by the transmitter 11.

FIG. 7 illustrates an example of an operation in a case of operating the two transmitters 11 and 12 in the operation mode M1. The signal at the output terminal Tout1N is similar to the signal at the output terminal Tout1P ((A) of FIG. 7). The signal at the output terminal Tout2N is similar to the signal at the output terminal Tout2P ((B) of FIG. 7). In this example, the transmitter 11 transmits the clock signal, and the transmitter 12 transmits the data signal.

First, at timing t11, the controller 14 causes the operation mode of the transmitter 11 to transition from the operation mode M2 (single-ended signal transmission mode) to the operation mode M1 (differential signal transmission mode). This causes the transmitter 11 to start transmitting the differential signal (signals SIG1P and SIG1N) as the clock signals ((A) of FIG. 7). In response to this, in the regulator 16, the load current Iload at the voltage generator 20 increases ((E) of FIG. 7).

Next, at timing t12, the control signal generator 27 of the regulator 16 changes the control signal Csw2 from low level to high level on the basis of the control signal supplied from the controller 14 ((D) of FIG. 7). This turns on the switch 26 in the regulator 16, to cause a current corresponding to the resistance value of the variable resistor 25 to flow to the switch 26. As a result, the load current Iload at the voltage generator 20 increases slightly ((E) of FIG. 7).

Next, at timing t13, the controller 14 causes the operation mode of the transmitter 12 to transition from the operation mode M2 (single-ended signal transmission mode) to the operation mode M1 (differential signal transmission mode). This causes the transmitter 12 to start transmitting the differential signal (signals SIG2P and SIG2N) as the data signals ((B) of FIG. 7). At the same time, the control signal generator 27 of the regulator 16 changes the control signal Csw2 from high level to low level on the basis of the control signal supplied from the controller 14 ((D) of FIG. 7). This turns off the switch 26 in the regulator 16. In this example, the amount of increase in the load current Iload as a result of operating the transmitter 12 in the operation mode M1 is larger than the amount of decrease in the load current Iload as a result of turning off the switch 26. As a result, the load current Iload at the voltage generator 20 increases slightly ((E) of FIG. 7).

Next, at timing t14, the controller 14 causes the operation mode of the transmitter 12 to transition from the operation mode M1 (differential signal transmission mode) to the operation mode M2 (single-ended signal transmission mode). This causes the transmitter 12 to stop transmitting the differential signal (signals SIG2P and SIG2N) ((B) of FIG. 7). At the same time, the control signal generator 27 of the regulator 16 changes the control signal Csw2 from low level to high level on the basis of the control signal supplied from the controller 14 ((D) of FIG. 7). This turns on the switch 26 in the regulator 16. In this example, the amount of decrease in the load current Iload as a result of operating the transmitter 12 in the operation mode M2 is larger than the amount of increase in the load current Iload as a result of turning on the switch 26. As a result, the load current Iload at the voltage generator 20 decreases slightly ((E) of FIG. 7).

Next, at timing t15, the control signal generator 27 of the regulator 16 changes the control signal Csw2 from high level to low level on the basis of the control signal supplied from the controller 14 ((D) of FIG. 7). This turns off the switch 26 in the regulator 16. As a result, the load current Iload at the voltage generator 20 decreases slightly ((E) of FIG. 7).

Then, at timing t16, the controller 14 causes the operation mode of the transmitter 11 to transition from the operation mode M1 (differential signal transmission mode) to the operation mode M2 (single-ended signal transmission mode). This causes the transmitter 11 to stop transmitting the differential signal (signals SIG1P and SIG1N) ((A) of FIG. 7). As a result, the load current Iload at the voltage generator 20 decreases ((E) of FIG. 7).

In this manner, in the transmission device 10, in a case where the transmitter 11 is operating in the operation mode M1 (differential signal transmission mode), the switch 26 is turned on prior to causing the operation mode of the transmitter 12 to transition from the operation mode M2 (single-ended signal transmission mode) to the operation mode M1. Then, at the timing t13 at which the operation mode of the transmitter 12 transitions to the operation mode M1, the switch 26 is turned off. In addition, in the transmission device 10, the switch 26 is turned on at the timing t14 at which the operation mode of the transmitter 12 is caused to transition from the operation mode M1 (differential signal transmission mode) to the operation mode M2 (single-ended signal transmission mode), and thereafter the switch 26 is turned off. This enables the transmission device 10 to moderately change the load current Iload at the voltage generator 20, thus making it possible to suppress the occurrence of the electro-magnetic interference associated with the fluctuation in the common mode voltage COM of the differential signal (signals SIG1P and SIG1N) that are being transmitted by the transmitter 11.

In addition, in the transmission device 10, as illustrated in FIGS. 6 and 7, a manner of operation of the switches 24 and 26 is changed in accordance with the number of transmitters operating in the operation mode M1, among the transmitters 11, 12, and 13. Specifically, for example, as illustrated in FIG. 6, in a case of causing the operation mode of the two transmitters 12 and 13 to transition to the operation mode M1 (differential signal transmission mode), the load current Iload is increased at the timings t2 and t3. In a case of causing the operation mode of the two transmitters 12 and 13 to transition to the operation mode M2 (single-ended signal transmission mode), the load current Iload is decreased at the timings t6 and t7. In other words, in this example, the load current Iload is changed in two stages due to a significant amount of change in the load current Iload. In addition, as illustrated in FIG. 7, in a case of causing the operation mode of one transmitter 12 to transition to the operation mode M1, the load current Iload is increased at the timing t12. In a case of causing the operation mode of the one transmitter 12 to transition to the operation mode M2, the load current Iload is decreased at the timing t15. In other words, in this example, the load current Iload is changed in a single stage because of smaller amount of change in the load current Iload than in the case of FIG. 6. This makes it possible to effectively suppress the occurrence of the electro-magnetic interference while suppressing power consumption.

COMPARATIVE EXAMPLE

Next, effects of the present embodiment are described as compared with a communication system 1R according to a comparative example. This communication system 1R includes a transmission device 10R and a reception device 50R. The transmission device 10R includes a controller 14R and a regulator 16R. The regulator 16R omits the variable resistors 23 and 25, the switches 24 and 26, and the control signal generator 27 from the regulator 16 according to the present embodiment (FIG. 2). Other configurations are similar to those in the present embodiment (FIG. 1, etc.).

FIG. 8 illustrates an example of an operation of the communication system 1R. (A) of FIG. 8 illustrates a waveform of a signal at the output terminal Tout1P. (B) of FIG. 8 illustrates a waveform of a signal at the output terminal Tout2P. (C) of FIG. 8 illustrates a waveform of the load current Iload. In this example, the two transmitters 11 and 12 are operated in the operation mode M1. Specifically, the transmitter 11 transmits the clock signal, and the transmitter 12 transmits the data signal.

First, at timing t21, the controller 14R causes the operation mode of the transmitter 11 to transition from the operation mode M2 (single-ended signal transmission mode) to the operation mode M1 (differential signal transmission mode). This causes the transmitter 11 to start transmitting the differential signal (signals SIG1P and SIG1N) as the clock signals ((A) of FIG. 8). In response to this, in the regulator 16R, the load current Iload at the voltage generator 20 increases ((C) of FIG. 8).

Next, at timing t22, the controller 14R causes the operation mode of the transmitter 12 to transition from the operation mode M2 (single-ended signal transmission mode) to the operation mode M1 (differential signal transmission mode). This causes the transmitter 12 to start transmitting the differential signal (signals SIG2P and SIG2N) as the data signals ((B) of FIG. 8). As a result, the load current Iload at the voltage generator 20 increases ((C) of FIG. 8).

Next, at timing t23, the controller 14R causes the operation mode of the transmitter 12 to transition from the operation mode M1 (differential signal transmission mode) to the operation mode M2 (single-ended signal transmission mode). This causes the transmitter 12 to stop transmitting the differential signal (signals SIG2P and SIG2N) ((B) of FIG. 8). As a result, the load current Iload at the voltage generator 20 decreases ((C) of FIG. 8).

Then, at timing t24, the controller 14R causes the operation mode of the transmitter 11 to transition from the operation mode M1 (differential signal transmission mode) to the operation mode M2 (single-ended signal transmission mode). This causes the transmitter 11 to stop transmitting the differential signal (signals SIG1P and SIG1N) ((A) of FIG. 8). As a result, the load current Iload at the voltage generator 20 decreases ((C) of FIG. 8).

In this manner, in the transmission device 10R, for example, the load current Iload changes rapidly when (at the timing t22) the operation mode of the transmitter 12 is caused to transition to the operation mode M1 (differential signal transmission mode), and when (at the timing t23) the operation mode of the transmitter 12 is caused to transition to the operation mode M2 (single-ended signal transmission mode). This leads to a possibility that the voltage Vreg may fluctuate significantly in in association with the rapid change in the load current Iload. In this case, there occurs a significant fluctuation in the common mode voltage COM of the signals SIG1P and SIG1N ((A) of FIG. 8) transmitted by the transmitter 11.

FIG. 9A illustrates an example of a waveform of each of the load current Iload and the signals SIG1P and SIG1N. In this example, in response to the increase in the load current Iload, a fluctuation in the voltage Vreg occurs, which results in a disturbance in the waveform of the signals SIG1P and SIG1N as illustrated by a waveform W1. This causes a significant fluctuation in the common mode voltage COM.

FIG. 9B schematically illustrates a waveform of each of the signals SIG1P and SIG1N. In this example, when each of the signals SIG1P and SIG1N transitions, a fluctuation in the voltage Vreg occurs in association with the transition of the operation mode of the transmitter 12. The fluctuation in the voltage Vreg causes a fluctuation in the common mode voltage COM of the differential signal (signals SIG1P and SIG1N) as illustrated by a waveform W2.

In this manner, in the transmission device 10R according to the comparative example, for example, the load current load changes rapidly when the operation mode of the transmitter 12 transitions between the operation mode M1 and the operation mode M2. Thus, in the transmission device 10R, the voltage Vreg fluctuates in response to the rapid change in the load current, and the common mode voltage COM of the differential signal fluctuates in response to the fluctuation in the voltage Vreg, which results in the possibility that the electro-magnetic interference may occur.

Meanwhile, in the transmission device 10 according to the present embodiment, for example, the load current Iload at the voltage generator 20 in the regulator 16 is caused to change moderately when the operation mode of the transmitter 12 transitions between the operation mode M1 and the operation mode M2. This makes it possible for the transmission device 10 to suppress the fluctuation in the voltage Vreg associated with the change in the load current Iload, thus making it possible to reduce the possibility that the electro-magnetic interference may occur.

[Effects]

As described above, in the present embodiment, the load current at the voltage generator in the regulator is caused to change moderately when the operation mode transitions between the differential signal transmission mode and the single-ended signal transmission mode, thus making it possible to reduce the possibility that the electro-magnetic interference may occur.

In the present embodiment, the manner of operation of the switch is changed in accordance with the number of the transmitters operating in the differential signal transmission mode, thus making it possible to effectively reduce the possibility that the electro-magnetic interference may occur while suppressing power consumption.

MODIFICATION EXAMPLE 1-1

In the foregoing embodiment, the regulator 16 includes the two switches 24 and 26, but this is not limitative. Alternatively, one switch may be provided, or three or more switches may be provided.

MODIFICATION EXAMPLE 1-2

In the foregoing embodiment, the transmission device 10 transmits the clock signal in addition to the data signal, but this is not limitative. Alternatively, for example, it is not necessary to transmit the clock signal.

MODIFICATION EXAMPLE 1-3

In the foregoing embodiment, in FIG. 6, the load current Iload at the voltage generator 20 is caused to change moderately when the operation mode of the transmitters 12 and 13 transitions between the operation mode M1 and the operation mode M2. However, this is not limitative. Moreover, for example, the load current Iload at the voltage generator 20 may be caused to change moderately when the operation mode of the transmitter 11 transitions between the operation mode M1 and the operation mode M2. In this case, it is also possible to suppress the fluctuation in the common mode voltage COM of the signals SIG1P and SIG1N themselves, thus making it possible to reduce the electro-magnetic interference. In addition, when starting to transmit the signals SIG1P and SIG1N, it is possible to shorten settling time until the signals SIG1P and SIG1N become stable.

2. <Second Embodiment>

Next, a communication system 2 according to a second embodiment is described. In the present embodiment, a signal is transmitted using three voltages in the operation mode M1. It is to be noted that the same reference numerals are assigned to substantially the same components as those in the communication system 1 according to the foregoing first embodiment, and descriptions thereof are omitted where appropriate.

FIG. 10 illustrates a configuration example of the communication system 2 according to the present embodiment. The communication system 2 includes a transmission device 110, a transmission path 190, and a reception device 150. The communication system 2 transmits a signal from the transmission device 110 to the reception device 150 via the transmission path 190. The transmission device 110 includes output terminals Tout1A, Tout1B, and Tout1C, output terminals Tout2A, Tout2B, and Tout2C, and Tout3A, Tout3B, and Tout3C. The transmission path 190 includes lines 191A, 191B, and 191C, lines 192A, 192B, and 192C, and lines 193A, 193B, and 193C. The reception device 150 includes input terminals Tin1A, Tin1B, and Tin1C, input terminals Tin2A, Tin2B, and Tin2C, and Tin3A, Tin3B, and Tin3C. The output terminal Tout1A of the transmission device 110 and the input terminal Tin1A of the reception device 150 are coupled to each other via the line 191A. The output terminal Tout1B of the transmission device 110 and the input terminal Tin1B of the reception device 150 are coupled to each other via the line 191B. The output terminal Tout1C of the transmission device 110 and the input terminal Tin1C of the reception device 150 are coupled to each other via the line 191C. Likewise, the output terminal Tout2A of the transmission device 110 and the input terminal Tin2A of the reception device 150 are coupled to each other via the line 192A. The output terminal Tout2B of the transmission device 110 and the input terminal Tin2B of the reception device 150 are coupled to each other via the line 192B. The output terminal Tout2C of the transmission device 110 and the input terminal Tin2C of the reception device 150 are coupled to each other via the line 192C. In addition, the output terminal Tout3A of the transmission device 110 and the input terminal Tin3A of the reception device 150 are coupled to each other via the line 193A. The output terminal Tout3B of the transmission device 110 and the input terminal Tin3B of the reception device 150 are coupled to each other via the line 193B. The output terminal Tout3C of the transmission device 110 and the input terminal Tin3C of the reception device 150 are coupled to each other via the line 193C. In this example, the lines 191A, 191B, 191C, 192A, 192B, 192C, 193A, 193B, and 193C each have a characteristic impedance of about 50[Ω].

(Transmission Device 110)

The transmission device 110 includes a controller 114, a processor 115, and transmitters 111, 112, and 113.

The controller 114 controls operations in the transmission device 110. Specifically, the controller 114 sets the operation mode for each of the transmitters 111, 112, and 113. Each of the transmitters 111, 112, and 113, as with the transmitters 11, 12, and 13 according to the foregoing first embodiment, has two operation modes M1 and M2.

The operation mode M1 is a mode (a three-phase signal transmission mode) in which, for example, captured data. etc. are transmitted using a signal having three voltages at a symbol rate of 2.5 [Gsps], for example. Specifically, as described later, in a case where the transmitter 111 operates in the operation mode M1, the transmitter 111 transmits a three-phase signal (signals SIG1A, SIG1B, and SIG1C) via the output terminals Tout1A, Tout1B, and Tout1C. Likewise, in a case where the transmitter 112 operates in the operation mode M1, the transmitter 112 transmits a three-phase signal (signals SIG2A, SIG2B, and SIG2C) via the output terminals Tout2A. Tout2B, and Tout2C. In addition, in a case where the transmitter 113 operates in the operation mode M1, the transmitter 113 transmits a three-phase signal (signals SIG3A, SIG3B, and SIG3C) via the output terminals Tout3A. Tout3B, and Tout3C.

FIG. 11 illustrates a voltage level of each of the signals SIG1A, SIG1B, and SIG1C. It is to be noted that the same applies to the signals SIG2A, SIG2B, and SIG2C and the signals SIG3A, SIG3B, and SIG3C. The transmitter 111 transmits six symbols "+x", "−x", "+y", "−y", "+z", and "−z", using the three signals SIG1A, SIG1B, and SIG1C. For example, in a case of transmitting the symbol "+x", the transmitter 111 sets the signal SIG1A to the high-level voltage VH, sets the signal SIG1B to the low-level voltage VL, and sets the signal SIG1C to the medium-level voltage VM. In a case of transmitting the symbol "−x", the transmitter 111 sets the signal SIG1A to the low-level voltage VL, sets the signal SIG1B to the high-level voltage VH, and sets the signal SIG1C to the medium-level voltage VM. In a case of transmitting the symbol "+y", the transmitter 111 sets the signal SIG1A to the medium-level voltage VM, sets the signal SIG1B to the high-level voltage VH, and sets the signal SIG1C to the low-level voltage VL. In a case of transmitting the symbol "−y", the transmitter 111 sets the signal SIG1A to the medium-level voltage VM, sets the signal SIG1B to the low-level voltage VL, and sets the signal SIG1C to the high-level voltage VH. In a case of transmitting the symbol "+z", the transmitter 111 sets the signal SIG1A to the low-level voltage VL, sets the signal SIG1B to the medium-level voltage VM, and sets the signal SIG1C to the high-level voltage VH. In a case of transmitting the symbol "−z", the transmitter 11 sets the signal SIG1A to the high-level voltage VH, sets the signal SIG1B to the medium-level voltage VM, and sets the signal SIG1C to the low-level voltage VL.

In a case where the transmitter 111 operates in the operation mode M1, the lines 191A, 191B, and 191C transmit a sequence of the symbol using such signals SIG1A, SIG1B, and SIG1C. In other words, in the operation mode M1, the lines 191A, 191B, and 191C correspond to one transmission lane L through which the three-phase signal (signals SIG1A, SIG1B, and SIG1C) is transmitted. Likewise, the lines 192A, 192B, and 192C correspond to one transmission lane L through which the three-phase signal (signals SIG2A, SIG2B, and SIG2C) is transmitted. The lines 193A. 193B, and 193C correspond to one transmission lane L through which the three-phase signal (signals SIG3A, SIG3B, and SIG3C) is transmitted.

The operation mode M2, as with the case of the foregoing first embodiment, is a mode (single-ended signal transmission mode) in which control data. etc. are transmitted at a bit rate of 10 [Mbps], for example, using the single-ended signal.

The controller 114, as with the case of the foregoing first embodiment, selectively sets the operation mode of each of the transmitters 111, 112, and 113 to one of these two operation modes M and M2.

In addition, for example, as with the case of the foregoing first embodiment, the controller 114 also has a function of controlling the operation of the regulator 16 to moderately change the load current Iload at the voltage generator 20 in the regulator 16 when the operation mode of each of the transmitters 111, 112, and 113 transitions between the operation mode M1 and the operation mode M2.

The processor 115 performs processing corresponding to the operation mode of each of the transmitters 111, 112, and 113 on the basis of the control signal supplied from the controller 114, and supplies a signal to each of the transmitters 111, 112, and 113.

The transmitter 111 generates, in the operation mode M1 (three-phase signal transmission mode), the three-phase signal (signals SIG1A, SIG1B, and SIG1C) on the basis of the signal supplied from the processor 115, and generates, in the operation mode M2 (single-ended signal transmission mode), the single-ended signal on the basis of the signal supplied from the processor 115. Likewise, the transmitter 112 generates, in the operation mode M1, the three-phase signal (signals SIG2A, SIG2B, and SIG2C) on the basis of the signal supplied from the processor 115, and generates, in the operation mode M2, the single-ended signal on the basis of the signal supplied from the processor 115. In addition, the transmitter 113 generates, in the operation mode M1, the three-phase signal (signals SIG3A, SIG3B, and SIG3C) on the basis of the signal supplied from the processor 115, and generates, in the operation mode M2, the single-ended signal on the basis of the signal supplied from the processor 115.

FIG. 12 illustrates a configuration example of the transmitter 111. It is to be noted that the same applies to the transmitters 112 and 113. The transmitter 111 includes an interface 121, a mapper 122, serializers 123, 124, and 125, an encoder 126, pre-driver sections 127, 128, and 129, driver sections 131, 132, and 133, an encoder 134, and driver sections 135, 136, and 137.

The interface 121 supplies signals to the encoder 134 and the mapper 122 on the basis of the signals supplied from the controller 114 and the processor 115. Specifically, the interface 121 supplies signals to the mapper 122 in a case where the transmitter 111 operates in the operation mode M1 (three-phase signal transmission mode), and supplies a signal to the encoder 134 in a case where the transmitter 111 operates in the operation mode M2 (single-ended signal transmission mode).

The mapper 122 generates three sets of parallel signals by performing predetermined mapping processing on the basis of the signals supplied from the interface 121.

The serializer 123 serializes one of the sets of parallel signals supplied from the mapper 122. The serializer 124 serializes one of the sets of parallel signals supplied from the mapper 122. The serializer 125 serializes one of the sets of parallel signals supplied from the mapper 122.

The encoder 126 generates three signals SA, SB, and SC by performing predetermined encoding processing on the basis of signals supplied from the serializers 123, 124, and 125.

The pre-driver section 127 drives the driver section 131 on the basis of the signal SA. The pre-driver section 128 drives the driver section 132 on the basis of the signal SB. The pre-driver section 129 drives the driver section 133 on the basis of the signal SC.

The driver section 131 generates the signal SIG1A on the basis of the signal supplied from the pre-driver section 127 in a case where the transmitter 111 operates in the operation mode M (three-phase signal transmission mode). The driver section 132 generates the signal SIG1B on the basis of the signal supplied from the pre-driver section 128 in a case where the transmitter 111 operates in the operation mode M1. The driver section 133 generates the signal SIG1C on the basis of the signal supplied from the pre-driver section 129 in a case where the transmitter 111 operates in the operation mode M1.

FIG. 13 illustrates a configuration example of the pre-driver section 127 and the driver section 131. It is to be noted that the same applies to the pre-driver section 128 and the driver section 132, and the same applies to the pre-driver section 129 and the driver section 133. The pre-driver section 127 includes pre-drivers 81, 82, 83, and 84. The driver section 131 includes transistors 141, 142, 143, and 144, and resistors 145 and 146. In this example, the signal SA includes signals S11, S12, S13, and S14.

The pre-driver 81 drives the transistor 141 on the basis of the signal S11. The pre-driver 82 drives the transistor 142 on the basis of the signal S12. The pre-driver 83 drives the transistor 143 on the basis of the signal S13. The pre-driver 84 drives the transistor 144 on the basis of the signal S14.

In this example, each of the transistors 141 to 144 is an N-channel MOS FET. The transistor 141 has a drain supplied with the voltage Vreg, a gate supplied with an output signal from the pre-driver 81, and a source coupled to a drain of the transistor 142 and to one end of the resistor 145. The transistor 142 has the drain coupled to the source of the transistor 141 and to the one end of the resistor 145, a gate supplied with an output signal from the pre-driver 82, and a source grounded. The transistor 143 has a drain supplied with the voltage Vreg, a gate supplied with an output signal from the pre-driver 83, and a source coupled to a drain of the transistor 144 and to one end of the resistor 146. The transistor 144 has the drain coupled to the source of the transistor 143 and to the one end of the resistor 146, a gate supplied with an output signal from the pre-driver 84, and a source grounded.

The resistor 145 has the one end coupled to the source of the transistor 141 and to the drain of the transistor 142, and has another end coupled to another end of the resistor 146 and to the output terminal Tout1A. The resistor 146 has the one end coupled to the source of the transistor 143 and to the drain of the transistor 144, and has the other end coupled to the other end of the resistor 145 and to the output terminal Tout1A. In this example, a sum of a resistance value of the resistor 145 and a resistance value of the transistor 141 in an ON-state is about 100[Ω], and a sum of the resistance value of the resistor 145 and a resistance value of the transistor 142 in an ON-state is about 100[Ω]. Likewise, a sum of a resistance value of the resistor 146 and a resistance value of the transistor 143 in an ON-state is about 100 [i], and a sum of the resistance value of the resistor 146 and a resistance value of the transistor 144 in an ON-state is about 100[Ω].

In accordance with this configuration, for example, in a case where the signals S11 and S13 are at high level and the signals S12 and S14 are at low level, the transistors 141 and 143 are turned on while the transistors 142 and 144 are turned off in the driver section 131. This causes the voltage at the output terminal Tout1A to be the high-level voltage VH, and causes the output impedance of the driver section 131 to be about 50 [Ω]. In addition, for example, in a case where the signals S11 and S13 are at low level and the signals S12 and S14 are at high level, the transistors 141 and 143 are turned off while the transistors 142 and 144 are turned on in the driver section 131. This causes the voltage at the output terminal Tout1A to be the low-level voltage VL, and causes the output impedance of the driver section 131 to be about 50[Ω]. In addition, for example, in a case where the signals S11 and S12 are at high level and the signals S13 and S14 are at low level, the transistors 141 and 142 are turned on while the transistors 143 and 144 are turned off. This achieves Thevenin Termination in the driver section 131, to cause the voltage at the output terminal Tout1A to be the medium-level voltage VM and to cause the output impedance of the driver section 131 to be about 50[Ω]. It is to be noted that, in this example, the voltage at the output terminal Tout1A is set to the medium-level voltage VM by setting the signals S11 and S12 to high level while setting the signals S13 and S14 to low level, but this is not limitative. Alternatively, for example, the signals S11 to S14 may be set to low level. This turns off the transistors 141 to 144 in the driver section 131. At this time, the voltage at the output terminal Tout1A is set to the medium-level voltage VM by a termination resistor (described later) of the reception device 150.

It is to be noted that the driver sections 131, 132, and 133, as with the driver sections 35 and 36 according to the foregoing first embodiment, turn off the transistors 141, 142, 143, and 144 in a case where the transmitter 111 operates in the operation mode M2 (single-ended signal transmission mode). This enables the driver sections 131, 132, and 133 to set the output impedance to a high impedance in the operation mode M2.

The encoder 134 generates three signals by performing predetermined encoding processing on the basis of the signal supplied from the interface 121, and supplies these three signals to the respective driver sections 135, 136, and 137.

The driver section 135 generates a single-ended signal on the basis of the signal supplied from the encoder 134 in a case where the transmitter 111 operates in the operation mode M2 (single-ended signal transmission mode). Likewise, the driver section 136 generates a single-ended signal on the basis of the signal supplied from the encoder 134 in a case where the transmitter 111 operates in the operation mode M2. The driver section 137 generates a single-ended signal on the basis of the signal supplied from the encoder 134 in a case where the transmitter 111 operates in the operation mode M2. It is to be noted that each of the driver sections 135, 136, and 137 sets the output impedance to a high impedance in a case where the transmitter 111 operates in the operation mode M1 (three-phase signal transmission mode).

(Reception Device 150)

As illustrated in FIG. 10, the reception device 150 includes a controller 154, receivers 151, 152, and 153, and a processor 155.

The controller 154 controls operations in the reception device 150. In addition, as described later, the controller 154 also has a function of controlling turning on and off of the termination resistor by supplying the control signal to the receivers 151, 152, and 153.

In a case where the transmitter 111 operates in the operation mode M1 (three-phase signal transmission mode), the receiver 151 receives, via the input terminals Tin1A, Tin1B, and Tin1C, the three-phase signal (signals SIG1A, SIG1B, and SIG1C) transmitted by the transmitter 111. In a case where the transmitter 111 operates in the operation mode M2 (single-ended signal transmission mode), the receiver 151 receives, via each of the input terminals Tin1A, Tin1B, and Tin1C, the single-ended signal transmitted by the transmitter 111. Likewise, in a case where the transmitter 112 operates in the operation mode M1, the receiver 152 receives, via the input terminals Tin2A, Tin2B, and Tin2C, the three-phase signal (signals SIG2A, SIG2B, and SIG2C) transmitted by the transmitter 112. In a case where the transmitter 112 operates in the operation mode M2, the receiver 152 receives, via each of the input terminals Tin2A, Tin2B, and Tin2C, the single-ended signal transmitted by the transmitter 112. In addition, in a case where the transmitter 113 operates in the operation mode M1, the receiver 153 receives, via the input terminals Tin3A, Tin3B, and Tin3C, the three-phase signal (signals SIG3A, SIG3B, and SIG3C) transmitted by the transmitter 113. In a case where the transmitter 113 operates in the operation mode M2, the receiver 153 receives, via each of the input terminals Tin3A, Tin3B, and Tin3C, the single-ended signal transmitted by the transmitter 113.

FIG. 14 illustrates a configuration example of the receiver 151. It is to be noted that the same applies to the receivers 152 and 153. The receiver 51 includes resistors 161, 162, and 163, switches 164, 165, and 166, receivers 167, 168, and 169, and receivers 171, 172, and 173.

Each of the resistors 161, 162, and 163 functions as a termination resistor of the communication system 2, and has a resistance value of about 50[Ω] in this example. The resistor 161 has one end coupled to the input terminal Tin1A, and has another end coupled to one end of the switch 164. The resistor 162 has one end coupled to the input terminal Tin1B, and has another end coupled to one end of the switch 165. The resistor 163 has one end coupled to the input terminal Tin1C, and has another end coupled to one end of the switch 166.

The switch 164 has the one end coupled to the other end of the resistor 161, and has another end coupled to another end of each of the switches 165 and 166. The switch 165 has the one end coupled to the other end of the resistor 162, and has the other end coupled to the other end of each of the switches 164 and 166. The switch 166 has the one end coupled to the other end of the resistor 163, and has the other end coupled to the other end of each of the switches 164 and 165. The switches 164, 165, and 166 are turned on and off on the basis of the control signal supplied from the controller 154. Specifically, the switches 164, 165, and 166 are turned on when the transmitter 111 operates in the operation mode M1 and the receiver 151 receives the three-phase signal (signals SIG1A, SIG1B, and SIG1C). In addition, the switches 164, 165, and 166 are turned off when the transmitter 111 operates in the operation mode M2 and the receiver 151 receives the single-ended signal.

The receivers 167, 168, and 169 receive the three-phase signal (signals SIG1A, SIG1B, and SIG1C) in a case where the transmitter 111 operates in the operation mode M1 (differential signal transmission mode). The receiver 167 has a positive input terminal coupled to a negative input terminal of the receiver 169 and to the one end of the resistor 161, and has a negative input terminal coupled to a positive input terminal of the receiver 168 and to the one end of the resistor 162. The receiver 168 has the positive input terminal coupled to the negative input terminal of the receiver 167 and to the one end of the resistor 162, and has a negative input terminal coupled to a positive input terminal of the receiver 169 and to the one end of the resistor 163. The receiver 169 has the positive input terminal coupled to the negative input terminal of the receiver 168 and to the one end of the resistor 163, and has the negative input terminal coupled to the positive input terminal of the receiver 167 and to the one end of the resistor 161.

In accordance with this configuration, the receiver 167 outputs a signal corresponding to a difference AB (SIG1A−SIG1B) between the signals SIG1A and SIG1B, the receiver 168 outputs a signal corresponding to a difference BC (SIG1B−SIG1C) between the signals SIG1B and SIG1C, and the receiver 169 outputs a signal corresponding to a difference CA (SIG1C−SIG1A) between the signals SIG1C and SIG1A.

FIG. 15 illustrates an example of an operation of each of the receivers 167, 168, and 169 in a case where the receiver 151 receives the three-phase signal (signals SIG1A, SIG1B, and SIG1C). It is to be noted that the switches 164, 165, and 166 are turned on, and thus the illustration thereof is omitted. In this example, the voltage of the signal SIG1A is the high-level voltage VH, the voltage of the signal SIG1B is the low-level voltage VL, and the voltage of the signal SIG1C is the medium-level voltage VM. In this case, a current Iin flows through, in order of, the input terminal Tin1A, the resistor 161, the resistor 162, and the input terminal Tin1B. Then, the positive input terminal of the receiver 167 is supplied with the high-level voltage VH while the negative input terminal is supplied with the low-level voltage VL, which results in the difference AB being positive (AB>0), thus causing the receiver 167 to output "1". In addition, the positive input terminal of the receiver 168 is supplied with the low-level voltage VL while the negative input terminal is supplied with the medium-level voltage VM, which results in the difference BC being negative (BC<0), thus causing the receiver 168 to output "0". In addition, the positive input terminal of the receiver 169 is supplied with the medium-level voltage VM while the negative input terminal is supplied with the high-level voltage VH, which results in the difference CA being negative (CA<0), thus causing the receiver 169 to output "0".

The receiver 171 receives the single-ended signal in a case where the transmitter 111 operates in the operation mode M2 (single-ended signal transmission mode). The receiver 171 has an input terminal coupled to the one end of the resistor 161 and to the input terminal Tin1A. Likewise, the receiver 172 receives the single-ended signal in a case where the transmitter 111 operates in the operation mode M2, and has an input terminal coupled to the one end of the resistor 162 and to the input terminal Tin1B. In addition, the receiver 173 receives the single-ended signal in a case where the transmitter 111 operates in the operation mode M2, and has an input terminal coupled to the one end of the resistor 163 and to the input terminal Tin1C.

An interface 174 supplies, to the processor 155, the signals received by the receivers 167, 168, and 169 and the receivers 171, 172, and 173.

The processor 155 (FIG. 10) performs predetermined processing on the basis of the signals received by the receivers 151, 152, and 153 as well as the control signal supplied from the controller 154.

FIG. 16 illustrates an example of an operation in a case of operating two transmitters 111 and 112 in the operation mode M1. (A) of FIG. 16 illustrates a waveform of a signal at the output terminal Tout1A. (B) of FIG. 16 illustrates a waveform of the control signal Csw1 at the regulator 16. (C) of FIG. 16 illustrates a waveform of the control signal Csw2 at the regulator 16. (D) of FIG. 16 illustrates a waveform of the load current Iload at the voltage generator 20. It is to be noted that the signal at each of the output terminals Tout1B, Tout1C, Tout2A, Tout2B, and Tout2C is similar to the signal at the output terminal Tout1A ((A) of FIG. 16). In this example, each of the transmitters 111 and 112 transmits the data signal.

First, at timing t31, the control signal generator 27 of the regulator 16 changes the control signal Csw2 from low level to high level on the basis of the control signal supplied from the controller 114 ((C) of FIG. 16). This turns on the switch 26 in the regulator 16, to cause a current corresponding to the resistance value of the variable resistor 25 to flow to the switch 26. As a result, the load current Iload at the voltage generator 20 increases slightly ((D) of FIG. 16).

Next, at timing t32, the controller 114 causes the operation mode of the transmitters 111 and 112 to transition from the operation mode M2 (single-ended signal transmission mode) to the operation mode M1 (differential signal transmission mode). In response to this, at timing t33, the transmitter 111 starts transmitting the three-phase signal (signals SIG1A, SIG1B, and SIG1C), and the transmitter 112 starts transmitting the three-phase signal (signals SIG2A, SIG2B, and SIG2C) ((A) of FIG. 16). In addition, at the timing t32, the control signal generator 27 of the regulator 16 changes the control signal Csw2 from high level to low level on the basis of the control signal supplied from the controller 114 ((C) of FIG. 16). This turns off the switch 26 in the regulator 16. In this example, the amount of increase in the load current Iload as a result of operating the transmitter 12 in the operation mode M1 is larger than the amount of decrease in the load current Iload as a result of turning off the switch 26. As a result, the load current Iload at the voltage generator 20 increases slightly ((D) of FIG. 16).

Thereafter, for a period of time after the timing t32, the voltage Vreg fluctuates in response to the change in the load current Iload at the timing t32. As a result, during a period from the timing t33 to timing t34, the signals SIG1A, SIG1B, and SIG1C and the signals SIG2A, SIG2B, and SIG2C fluctuate in response to the fluctuation in the voltage Vreg ((A) of FIG. 16). Then, at the timing t34, the voltage Vreg becomes stable, and the fluctuations of the signals SIG1A, SIG1B, and SIG1C and the signals SIG2A, SIG2B, and SIG2C subside.

In this manner, in the transmission device 110, the switch 26 is turned on, in this example, prior to causing the operation mode of the transmitters 111 and 112 to transition from the operation mode M2 (single-ended signal transmission mode) to the operation mode M1 (three-phase signal transmission mode). Then, at the timing t32 at which the operation mode of the transmitters 111 and 112 transitions to the operation mode M1, the switch 26 is turned off. This enables the transmission device 110 to shorten time (settling time ts) until the signals SIG1A, SIG1B, and SIG1C and the signals SIG2A, SIG2B, and SIG2C become stable. In other words, for example, in a case where the switch 26 is not turned on and off, a significant amount of increase in the load current Iload at the timing 32 results in a significant fluctuation in the voltage Vreg that is caused by the change in the load current Iload while taking longer time until the voltage Vreg becomes stable. Meanwhile, in the transmission device 110, the switch 26 is turned on and off, thus making it possible to reduce the amount of increase in the load current Iload at the timing t32 and thereby suppress the fluctuation in the voltage Vreg. As a result, the transmission device 110 makes it possible to shorten the settling time ts.

In addition, the transmission device 110 makes it possible to suppress the fluctuation in the voltage Vreg in this manner, thus making it possible to, for example, suppress the fluctuation in the common mode voltage COM that is an average voltage of the three signals SIG1A, SIG1B, and SIG1C while suppressing the fluctuation in the common mode voltage COM that is an average voltage of the three signals SIG2A, SIG2B, and SIG2C. As a result, the communication system 2 makes it possible to reduce the possibility that electro-magnetic interference may occur.

As described above, in the present embodiment, the load current at the voltage generator in the regulator is caused to change moderately when the operation mode is caused to transition from the single-ended signal transmission mode to the differential signal transmission mode, thus making it possible to shorten the settling time. Other effects are similar to those in the case of the foregoing first embodiment.

MODIFICATION EXAMPLE 2-1

In the foregoing embodiment, the switch 26 is turned on and off, but this is not limitative. Alternatively, for example, the switch 24 may be turned on and off. In addition, for example, as with the case of the foregoing first embodiment (FIG. 6), the switches 24 and 26 may be turned on and off.

MODIFICATION EXAMPLE 2-2

As with the case of the first embodiment, the manner of operation of the switches 24 and 26 may be changed in accordance with the number of transmitters operating in the operation mode M1 (three-phase signal transmission mode), among the transmitters 111, 112, and 113.

3. <Application Examples>

Description is given next of application examples of the communication systems that have been described in the foregoing embodiments and modification examples.

APPLICATION EXAMPLE 1

FIG. 17 illustrates an appearance of a smartphone 300 (a multi-functional mobile phone) to which the communication system according to any of the foregoing embodiments, etc. is applied. Various devices are mounted in the smartphone 300. The communication system according to any of the foregoing embodiments, etc. is applied to a communication system that exchanges data between these devices.

FIG. 18 illustrates a configuration example of an application processor 310 used in the smartphone 300. The application processor 310 includes a central processing unit (CPU) 311, a memory controller 312, a power supply controller 313, an external interface 314, a graphics processing unit (GPU) 315, a media processor 316, a display controller 317, and a mobile industry processor interface (MIPI) interface 318. In this example, the CPU 311, the memory controller 312, the power supply controller 313, the external interface 314, the GPU 315, the media processor 316, and the display controller 317 are coupled to a system bus 319 to allow for mutual data exchange via the system bus 319.

The CPU 311 processes various pieces of information handled in the smartphone 300 in accordance with a program. The memory controller 312 controls a memory 501 used at a time when the CPU 311 performs information processing. The power supply controller 313 controls a power supply of the smartphone 300.

The external interface 314 is an interface for communication with external devices. In this example, the external interface 314 is coupled to a wireless communication section 502 and an image sensor 410. The wireless communication section 502 performs wireless communication with mobile phone base stations. The wireless communication section 502 includes, for example, a baseband section, a radio frequency (RF) front end section, and other components. The image sensor 410 acquires an image, and includes, for example, a CMOS sensor.

The GPU 315 performs image processing. The media processor 316 processes information such as voice, letters, and graphics. The display controller 317 controls the display 504 via the MIPI interface 318. The MIPI interface 318 transmits an image signal to the display 504. As the image signal, for example, a YUV-format signal, an RGB-format signal, or any other format signal may be used. The MIPI interface 318 operates, on the basis of a reference clock supplied from an oscillator circuit 330 including a crystal resonator, for example. For example, the communication system according to any of the foregoing embodiments, etc. is applied to a communication system between the MIPI interface 318 and the display 504.

FIG. 19 illustrates a configuration example of the image sensor 410. The image sensor 410 includes a sensor section 411, an image signal processor (ISP) 412, a joint photographic experts group (JPEG) encoder 413, a CPU 414, a random access memory (RAM) 415, a read only memory (ROM) 416, a power supply controller 417, an inter-integrated circuit ($I^2C$) interface 418, and an MIPI interface 419. In this example, these blocks are coupled to a system bus 420 to allow for mutual data exchange via the system bus 420.

The sensor section 411 acquires an image, and is configured by, for example, a CMOS sensor. The ISP 412 performs predetermined processing on the image acquired by the sensor section 411. The JPEG encoder 413 encodes the image processed by the ISP 412 to generate a JPEG-format image. The CPU 414 controls respective blocks of the image sensor 410 in accordance with a program. The RAM 415 is a memory used at a time when the CPU 414 performs information processing. The ROM 416 stores a program to be executed in the CPU 414, a setting value obtained by calibration, and any other information. The power supply controller 417 controls a power supply of the image sensor 410. The $I^2C$ interface 418 receives a control signal from the application processor 310. In addition, although not illustrated, the image sensor 410 also receives a clock signal from the application processor 310 in addition to the control signal. Specifically, the image sensor 410 is configured to be operable on the basis of clock signals of various frequencies. The MIPI interface 419 transmits an image signal to the application processor 310. As the image signal, for example, a YUV-format signal, an RGB-format signal, or any other format signal may be used. The MIPI interface 419 operates on the basis of a reference clock supplied from an oscillator circuit 430 including a crystal resonator, for example. For example, the communication system according to any of the foregoing embodiments, etc. is applied to a communication system between the MIPI interface 419 and the application processor 310.

APPLICATION EXAMPLE 2

FIG. 20 illustrates a configuration example of a vehicle control system 600 to which the communication system according to any of the foregoing embodiments, etc. is applied. The vehicle control system 600 controls operations of an automobile, an electric vehicle, a hybrid electric vehicle, a two-wheeled vehicle, and the like. This vehicle control system 600 includes a driving system control unit 610, a body system control unit 620, a battery control unit 630, an outside-vehicle information detecting unit 640, an in-vehicle information detecting unit 650, and an integrated control unit 660. These units are coupled to one another via a communication network 690. As the communication network 690, for example, a network in conformity with any standard such as a controller area network (CAN), a local interconnect network (LIN), a local area network (LAN), and FlexRay (Registered Trademark) may be used. Each of the units includes, for example, a microcomputer, a storage section, a drive circuit that drives a device to be controlled, a communication I/F, and the like.

The driving system control unit 610 controls operations of devices related to a driving system of a vehicle. A vehicle state detecting section 611 is coupled to the driving system control unit 610. The vehicle state detecting section 611 detects a state of the vehicle. The vehicle state detecting section 611 includes a gyro sensor, an acceleration sensor, a sensor that detects an amount of operation of an accelerator pedal and a brake pedal or a steering angle, or any other sensor, for example. The driving system control unit 610 controls the operations of the devices related to the driving system of the vehicle on the basis of information detected by the vehicle state detecting section 611. For example, the communication system of any of the foregoing embodiments, etc. is applied to a communication system between the driving system control unit 610 and the vehicle state detecting section 611.

The body system control unit 620 controls operations of various devices mounted on the vehicle, such as a keyless entry system, a power window device, and various lamps.

The battery control unit 630 controls a battery 631. The battery 631 is coupled to the battery control unit 630. The battery 631 supplies power to a driving motor, and includes, for example, a secondary battery, a cooling system, and the like. The battery control unit 630 acquires information such as temperature, an output voltage, and a remaining battery amount from the battery 631, and controls the cooling system, etc. of the battery 631 on the basis of the information. For example, the communication system of any of the foregoing embodiments, etc. is applied to a communication system between the battery control unit 630 and the battery 631.

The outside-vehicle information detecting unit 640 detects information outside the vehicle. An imaging section 641 and an outside-vehicle information detecting section 642 are coupled to the outside-vehicle information detecting unit 640. The imaging section 641 captures an image outside the vehicle, and includes, for example, a time of flight (ToF) camera, a stereo camera, a monocular camera, an infrared camera, and the like. The outside-vehicle information detecting section 642 detects information outside the vehicle, and includes, for example, a sensor that detects weather and climate, a sensor that detects other vehicles around the vehicle, an obstacle, a pedestrian, etc., and any other sensor. The outside-vehicle information detecting unit 640 recognizes, for example, weather and climate, a road surface condition, etc. on the basis of the image acquired by the imaging section 641 as well as the information detected by the outside-vehicle information detecting section 642, and detects objects such as other vehicles around the vehicle, an obstacle, a pedestrian, a sign, and letters on a road, or detects a distance between the object and the vehicle. For example, the communication system of any of the foregoing embodiments, etc. is applied to a communication system between the outside-vehicle information detecting unit 640 and each of the imaging section 641 and the outside-vehicle information detecting section 642.

The in-vehicle information detecting unit 650 detects information inside the vehicle. A driver state detecting section 651 is coupled to the in-vehicle information detecting unit 650. The driver state detecting section 651 detects a state of a driver, and includes, for example, a camera, a biosensor, a microphone, and the like. The in-vehicle information detecting unit 650 monitors, for example, a degree of fatigue of the driver or a degree of concentration of the driver, whether the driver is dozing, and any other factor, on the basis of information detected by the driver state detecting section 651. For example, the communication system of any of the foregoing embodiments, etc. is applied to a communication system between the in-vehicle information detecting unit 650 and the driver state detecting section 651.

The integrated control unit 660 controls operations of the vehicle control system 600. An operating section 661, a display section 662, and an instrument panel 663 are coupled to the integrated control unit 660. An occupant operates the operating section 661. The operating section 661 includes, for example, a touch panel, various buttons, switches, and the like. The display section 662 displays an image, and is configured by, for example, a liquid crystal display panel, etc. The instrument panel 663 displays a state of the vehicle, and includes meters such as a speed meter, various warning lamps, and the like. For example, the communication system of any of the foregoing embodiments, etc. is applied to a communication system between the integrated control unit 660 and each of the operating section 661, the display section 662, and the instrument panel 663.

Although the technology has been described above referring to some embodiments and modification examples as well as application examples to electronic apparatuses, the technology is not limited to these embodiments, etc., and may be modified in a variety of ways.

For example, in each of the foregoing embodiments, three transmitters are provided, but this is not limitative. Alternatively, for example, two or less transmitters may be provided, or four or more transmitters may be provided.

It is to be noted that effects described herein are merely illustrative and are not limitative, and may have other effects.

It is to be noted that the technology may have the following configurations.

(1)

A transmission device including:

a power supply section including a voltage generator that generates a power supply voltage, and a load section configured to be able to change a load current at the voltage generator;

a first transmitter having a first operation mode and a second operation mode, the first transmitter transmitting, in the first operation mode, a first signal on the basis of the power supply voltage; and a controller that controls an operation of the load section when an operation mode of the first transmitter transitions between the first operation mode and the second operation mode.

(2)

The transmission device according to (1), in which the first transmitter transmits a second signal in the second operation mode.

(3)

The transmission device according to (1) or (2), further including a second transmitter having the first operation mode and the second operation mode, the second transmitter transmitting, in the first operation mode, a third signal on the basis of the power supply voltage.

(4)

The transmission device according to (3), in which the controller controls the load section to cause the operation of the load section in a case of operating the first transmitter in the first operation mode to be different from the operation of the load section in a case of operating the first transmitter and the second transmitter in the first operation mode.

(5)

The transmission device according to (3) or (4), in which an operation mode of the second transmitter transitions from the second operation mode to the first operation mode at a first timing, the operation mode of the first transmitter transitions from the second operation mode to the first operation mode at a second timing after the first timing, and the controller controls the operation of the load section to increase the load current in a first period within a period from the first timing to the second timing.

(6)

The transmission device according to any one of (3) to (5), in which the operation mode of the first transmitter transitions from the first operation mode to the second operation mode at a third timing, the operation mode of the second transmitter transitions from the first operation mode to the second operation mode at a fourth timing after the third timing, and the controller controls the operation of the load section to increase the load current in a second period within a period from the third timing to the fourth timing.

(7)

The transmission device according to any one of (3) to (6), in which the first signal is a data signal, and the third signal is a clock signal.

(8)

The transmission device according to any one of (1) to (7), in which the controller controls the operation of the load section to increase the load current before the operation mode of the first transmitter transitions from the second operation mode to the first operation mode.

(9)

The transmission device according to any one of (1) to (8), in which the first transmitter includes a first driver that sets, in the first operation mode, a voltage at a first output terminal on the basis of the power supply voltage, and a second driver that sets, in the first operation mode, a voltage at a second output terminal on the basis of the power supply voltage, and in the first operation mode, the voltage at the first output terminal and the voltage at the second output terminal are different from each other.

(10)

The transmission device according to any one of (1) to (4), in which the first transmitter includes
a first driver that sets, in the first operation mode, a voltage at a first output terminal on the basis of the power supply voltage,
a second driver that sets, in the first operation mode, a voltage at a second output terminal on the basis of the power supply voltage, and
a third driver that sets, in the first operation mode, a voltage at a third output terminal on the basis of the power supply voltage, and
in the first operation mode, the voltage at the first output terminal, the voltage at the second output terminal, and the voltage at the third output terminal are different from one another.
(11)
The transmission device according to any one of (1) to (10), in which the controller controls the load current to change in stages.
(12)
The transmission device according to any one of (1) to (11), in which the controller also controls the operation mode of the first transmitter.
(13)
A transmission method including:
causing a voltage generator to generate a power supply voltage;
causing a first transmitter, when operating in a first operation mode, to transmit a first signal on the basis of the power supply voltage; and
controlling a load current at the voltage generator when an operation mode of the first transmitter transitions between the first operation mode and a second operation mode.
(14)
A communication system including:
a transmission device; and
a reception device,
the transmission device including
a power supply section including a voltage generator that generates a power supply voltage, and a load section configured to be able to change a load current at the voltage generator,
a first transmitter having a first operation mode and a second operation mode, the first transmitter transmitting, in the first operation mode, a first signal on the basis of the power supply voltage, and
a controller that controls an operation of the load section when an operation mode of the first transmitter transitions between the first operation mode and the second operation mode.

This application claims the benefit of Japanese Priority Patent Application JP2016-049184 filed with the Japan Patent Office on Mar. 14, 2016, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:
1. A transmission device comprising:
a power supply section including a voltage generator that generates a power supply voltage, and a load section configured to change a load current at the voltage generator;
a first transmitter including a first operation mode and a second operation mode, the first transmitter transmitting, in the first operation mode, a first signal on a basis of the power supply voltage; and
a controller configured to control an operation of the load section by changing the load current when an operation mode of the first transmitter transitions between the first operation mode and the second operation mode.

2. The transmission device according to claim 1, wherein the first transmitter transmits a second signal in the second operation mode.

3. The transmission device according to claim 1, further comprising a second transmitter including the first operation mode and the second operation mode, the second transmitter transmitting, in the first operation mode, a third signal on the basis of the power supply voltage.

4. The transmission device according to claim 3, wherein the controller controls the load section to cause the operation of the load section in a case of operating the first transmitter in the first operation mode to be different from the operation of the load section in a case of operating the first transmitter and the second transmitter in the first operation mode.

5. The transmission device according to claim 3, wherein
an operation mode of the second transmitter transitions from the second operation mode to the first operation mode at a first timing,
the operation mode of the first transmitter transitions from the second operation mode to the first operation mode at a second timing after the first timing, and
the controller controls the operation of the load section to increase the load current in a first period within a period from the first timing to the second timing.

6. The transmission device according to claim 3, wherein
the operation mode of the first transmitter transitions from the first operation mode to the second operation mode at a third timing,
an operation mode of the second transmitter transitions from the first operation mode to the second operation mode at a fourth timing after the third timing, and
the controller controls the operation of the load section to increase the load current in a second period within a period from the third timing to the fourth timing.

7. The transmission device according to claim 3, wherein
the first signal is a data signal, and
the third signal is a clock signal.

8. The transmission device according to claim 1, wherein the controller controls the operation of the load section to increase the load current before the operation mode of the first transmitter transitions from the second operation mode to the first operation mode.

9. The transmission device according to claim 1, wherein the first transmitter includes
a first driver that sets, in the first operation mode, a voltage at a first output terminal on the basis of the power supply voltage, and
a second driver that sets, in the first operation mode, a voltage at a second output terminal on the basis of the power supply voltage, and
in the first operation mode, the voltage at the first output terminal and the voltage at the second output terminal are different from each other.

10. The transmission device according to claim 1, wherein the first transmitter includes
a first driver that sets, in the first operation mode, a voltage at a first output terminal on the basis of the power supply voltage,
a second driver that sets, in the first operation mode, a voltage at a second output terminal on the basis of the power supply voltage, and a third driver that sets, in the first operation mode, a voltage at a third output terminal on the basis of the power supply voltage, and in the first operation mode, the voltage at the first output terminal, the voltage at the second output terminal, and the voltage at the third output terminal are different from one another.

11. The transmission device according to claim 1, wherein the controller controls the load current to change in stages.

12. The transmission device according to claim 1, wherein the controller also controls the operation mode of the first transmitter.

13. A transmission method comprising:
causing a voltage generator to generate a power supply voltage;
causing a first transmitter, when operating in a first operation mode, to transmit a first signal on a basis of the power supply voltage; and
changing a load current at the voltage generator when an operation mode of the first transmitter transitions between the first operation mode and a second operation mode.

14. A communication system comprising:
a transmission device; and
a reception device,
the transmission device including
a power supply section including a voltage generator that generates a power supply voltage, and a load section configured to change a load current at the voltage generator,
a first transmitter including a first operation mode and a second operation mode, the first transmitter transmitting, in the first operation mode, a first signal on a basis of the power supply voltage, and
a controller configured to control an operation of the load section by changing the load current when an operation mode of the first transmitter transitions between the first operation mode and the second operation mode.

15. The communication system according to claim 14, wherein the first transmitter transmits a second signal in the second operation mode.

16. The communication system according to claim 14, further comprising a second transmitter including the first operation mode and the second operation mode, the second transmitter transmitting, in the first operation mode, a third signal on the basis of the power supply voltage.

17. The communication system according to claim 16, wherein the controller controls the load section to cause the operation of the load section in a case of operating the first transmitter in the first operation mode to be different from the operation of the load section in a case of operating the first transmitter and the second transmitter in the first operation mode.

18. The communication system according to claim 16, wherein
an operation mode of the second transmitter transitions from the second operation mode to the first operation mode at a first timing,
the operation mode of the first transmitter transitions from the second operation mode to the first operation mode at a second timing after the first timing, and
the controller controls the operation of the load section to increase the load current in a first period within a period from the first timing to the second timing.

19. The communication system according to claim 16, wherein
the operation mode of the first transmitter transitions from the first operation mode to the second operation mode at a third timing,
an operation mode of the second transmitter transitions from the first operation mode to the second operation mode at a fourth timing after the third timing, and
the controller controls the operation of the load section to increase the load current in a second period within a period from the third timing to the fourth timing.

20. The communication system according to claim 14, wherein the controller controls the operation of the load section to increase the load current before the operation mode of the first transmitter transitions from the second operation mode to the first operation mode.

* * * * *